US008879882B2

(12) United States Patent
Conner et al.

(10) Patent No.: US 8,879,882 B2
(45) Date of Patent: Nov. 4, 2014

(54) VARIABLY CONFIGURABLE AND MODULAR LOCAL CONVERGENCE POINT

(75) Inventors: Mark Edward Conner, Granite Falls, NC (US); William Julius McPhil Giraud, Azle, TX (US); Lee Wayne Nored, Watauga, TX (US); Gary Bruce Schnick, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 272 days.

(21) Appl. No.: 13/094,572

(22) Filed: Apr. 26, 2011

(65) Prior Publication Data
US 2011/0211799 A1 Sep. 1, 2011

Related U.S. Application Data

(63) Continuation of application No. PCT/US2009/062266, filed on Oct. 27, 2009.

(60) Provisional application No. 61/108,788, filed on Oct. 27, 2008.

(51) Int. Cl.
*G02B 6/00* (2006.01)
*G02B 6/44* (2006.01)

(52) U.S. Cl.
CPC ............ *G02B 6/4471* (2013.01); *G02B 6/4452* (2013.01); *G02B 6/4454* (2013.01)
USPC .......................................... 385/135; 385/134

(58) Field of Classification Search
None
See application file for complete search history.

(56) References Cited

U.S. PATENT DOCUMENTS 1,280,393 A 10/1918 Cannon
1,703,255 A 2/1929 Wagner (Continued)

FOREIGN PATENT DOCUMENTS

DE 4130706 A1 3/1993
DE 4133375 C1 4/1993

(Continued)

OTHER PUBLICATIONS

Non-final Office Action for U.S. Appl. No. 12/417,250 mailed Jun. 23, 2011, 9 pages.

(Continued)

*Primary Examiner* — Uyen Chau N Le
*Assistant Examiner* — Chad Smith

(57) ABSTRACT

A variably configurable fiber optic terminal as a local convergence point in a fiber optic network is disclosed. The fiber optic terminal has an enclosure having a base and a cover which define an interior space. A feeder cable having at least one optical fiber and a distribution cable having at least one optical fiber are received into the interior space through a feeder cable port and a distribution cable port, respectively. A movable chassis positions in the interior space and is movable between a first position, a second position and third position. The movable chassis has a splitter holder area, a cassette area and a parking area. A cassette movably positions in the cassette area. A splitter module holder having a splitter module movably positioned therein movably positions in the splitter holder area. The optical fiber of the feeder cable and the optical fiber of the distribution cable are optically connected through the cassette, which also may be through the splitter module. In such case, the optical fiber of the feeder cable optically connects to an input optical fiber to the slitter module, where the optical signal is split into a plurality of output optical fibers. One of the plurality of output optical fibers connects to the optical fiber of the distribution cable for distribution towards a subscriber premises. The interior space is variably configurable by changeably positioning the cassette and splitter modules in the movable chassis.

32 Claims, 28 Drawing Sheets

(56) References Cited

U.S. PATENT DOCUMENTS

| | | | |
|---|---|---|---|
| 2,003,147 | A | 5/1935 | Holm-Hansen |
| 2,044,073 | A | 6/1936 | Hurley |
| 2,131,408 | A * | 9/1938 | Murrer ........................ 220/533 |
| 2,428,149 | A | 9/1947 | Falk |
| 2,681,201 | A * | 6/1954 | Grunwald ................. 248/316.7 |
| 2,984,488 | A | 5/1961 | Kirchner |
| 3,054,994 | A | 9/1962 | Haram |
| 3,204,867 | A | 9/1965 | Wahlbom |
| 3,435,124 | A | 3/1969 | Channell |
| 3,880,390 | A | 4/1975 | Niven |
| 4,006,540 | A | 2/1977 | Lemelson |
| 4,012,010 | A | 3/1977 | Friedman |
| 4,073,560 | A | 2/1978 | Anhalt et al. |
| 4,123,012 | A | 10/1978 | Hough |
| 4,177,961 | A | 12/1979 | Gruenewald |
| 4,210,380 | A | 7/1980 | Brzostek |
| D257,613 | S | 12/1980 | Gruenewald |
| 4,244,544 | A | 1/1981 | Kornat |
| 4,261,529 | A | 4/1981 | Sandberg et al. |
| 4,261,644 | A | 4/1981 | Giannaris |
| 4,480,449 | A | 11/1984 | Getz et al. |
| 4,497,457 | A | 2/1985 | Harvey |
| 4,502,754 | A | 3/1985 | Kawa |
| 4,506,698 | A | 3/1985 | Garcia et al. |
| 4,524,384 | A | 6/1985 | Lefkowitz et al. |
| D281,574 | S | 12/1985 | O'Hara, II |
| 4,579,310 | A | 4/1986 | Wells et al. |
| 4,586,675 | A | 5/1986 | Brown |
| 4,595,255 | A * | 6/1986 | Bhatt et al. .................... 385/135 |
| 4,611,887 | A | 9/1986 | Glover et al. |
| 4,697,873 | A | 10/1987 | Bouvard et al. |
| 4,736,100 | A | 4/1988 | Vastagh |
| 4,747,020 | A | 5/1988 | Brickley et al. |
| 4,778,125 | A | 10/1988 | Hu |
| 4,806,814 | A | 2/1989 | Nold |
| 4,810,054 | A | 3/1989 | Shinbori et al. |
| 4,824,193 | A | 4/1989 | Maeda et al. |
| 4,836,479 | A | 6/1989 | Adams |
| 4,844,573 | A | 7/1989 | Gillham et al. |
| 4,884,863 | A | 12/1989 | Throckmorton |
| 4,900,118 | A | 2/1990 | Yanagawa et al. |
| 4,900,123 | A | 2/1990 | Barlow et al. |
| 4,948,220 | A | 8/1990 | Violo et al. |
| 4,961,623 | A | 10/1990 | Midkiff et al. |
| 4,979,749 | A | 12/1990 | Onanian |
| 4,995,688 | A | 2/1991 | Anton et al. |
| 5,007,701 | A | 4/1991 | Roberts |
| 5,023,646 | A | 6/1991 | Ishida et al. |
| 5,048,916 | A | 9/1991 | Caron |
| 5,048,926 | A | 9/1991 | Tanimoto |
| 5,066,149 | A | 11/1991 | Wheeler et al. |
| 5,071,211 | A | 12/1991 | Debortoli et al. |
| 5,071,220 | A | 12/1991 | Ruello et al. |
| 5,073,042 | A | 12/1991 | Mulholland et al. |
| 5,074,635 | A | 12/1991 | Justice et al. |
| 5,076,688 | A | 12/1991 | Bowen et al. |
| 5,085,384 | A | 2/1992 | Kasubke |
| 5,112,014 | A | 5/1992 | Nichols |
| D327,312 | S | 6/1992 | Myojo |
| 5,121,458 | A | 6/1992 | Nilsson et al. |
| 5,142,598 | A | 8/1992 | Tabone |
| D330,368 | S | 10/1992 | Bourgeois et al. |
| 5,189,410 | A | 2/1993 | Kosugi et al. |
| 5,204,929 | A | 4/1993 | Machall et al. |
| 5,209,441 | A | 5/1993 | Satoh |
| 5,210,374 | A | 5/1993 | Channell |
| 5,214,735 | A | 5/1993 | Henneberger et al. |
| 5,218,664 | A | 6/1993 | O'Neill et al. |
| 5,231,687 | A | 7/1993 | Handley |
| 5,233,674 | A | 8/1993 | Vladic |
| 5,243,679 | A | 9/1993 | Sharrow et al. |
| 5,255,161 | A | 10/1993 | Knoll et al. |
| 5,260,957 | A | 11/1993 | Hakimi et al. |
| 5,261,020 | A | 11/1993 | de Jong et al. |
| 5,265,187 | A | 11/1993 | Morin et al. |
| 5,271,585 | A | 12/1993 | Zetena, Jr. |
| 5,274,731 | A | 12/1993 | White |
| 5,287,428 | A | 2/1994 | Shibata |
| 5,317,663 | A | 5/1994 | Beard et al. |
| 5,323,480 | A | 6/1994 | Mullaney et al. |
| 5,333,221 | A | 7/1994 | Briggs et al. |
| 5,333,222 | A | 7/1994 | Belenkiy et al. |
| 5,348,240 | A | 9/1994 | Carmo et al. |
| 5,359,688 | A | 10/1994 | Underwood |
| 5,363,465 | A | 11/1994 | Korkowski et al. |
| 5,367,598 | A | 11/1994 | Devenish, III et al. |
| 5,375,185 | A | 12/1994 | Hermsen et al. |
| 5,383,051 | A | 1/1995 | Delrosso et al. |
| 5,402,515 | A | 3/1995 | Vidacovich et al. |
| 5,408,557 | A | 4/1995 | Hsu |
| RE34,955 | E | 5/1995 | Anton et al. |
| 5,420,956 | A | 5/1995 | Grugel et al. |
| 5,420,958 | A | 5/1995 | Henson et al. |
| 5,428,705 | A | 6/1995 | Hermsen et al. |
| 5,432,875 | A | 7/1995 | Korkowski et al. |
| 5,438,641 | A | 8/1995 | Malacarne |
| 5,442,726 | A | 8/1995 | Howard et al. |
| 5,448,015 | A | 9/1995 | Jamet et al. |
| 5,460,342 | A | 10/1995 | Dore et al. |
| 5,473,115 | A | 12/1995 | Brownlie et al. |
| 5,479,553 | A | 12/1995 | Daems et al. |
| 5,479,554 | A | 12/1995 | Roberts |
| 5,490,229 | A | 2/1996 | Ghandeharizadeh et al. |
| 5,497,444 | A | 3/1996 | Wheeler |
| 5,515,472 | A | 5/1996 | Mullaney et al. |
| 5,542,015 | A | 7/1996 | Hultermans |
| 5,548,678 | A | 8/1996 | Frost et al. |
| 5,553,183 | A | 9/1996 | Bechamps |
| 5,553,186 | A | 9/1996 | Allen |
| 5,556,060 | A | 9/1996 | Bingham et al. |
| 5,559,922 | A | 9/1996 | Arnett |
| 5,570,895 | A | 11/1996 | McCue et al. |
| 5,579,425 | A | 11/1996 | Lampert et al. |
| 5,590,234 | A | 12/1996 | Pulido |
| 5,607,126 | A | 3/1997 | Cordola et al. |
| 5,613,030 | A | 3/1997 | Hoffer et al. |
| 5,617,501 | A | 4/1997 | Miller et al. |
| 5,627,925 | A | 5/1997 | Alferness et al. |
| 5,647,043 | A | 7/1997 | Anderson et al. |
| 5,649,042 | A | 7/1997 | Saito |
| 5,652,814 | A | 7/1997 | Pan et al. |
| 5,659,655 | A | 8/1997 | Pilatos |
| 5,689,605 | A | 11/1997 | Cobb et al. |
| 5,689,607 | A | 11/1997 | Vincent et al. |
| 5,692,299 | A | 12/1997 | Daems et al. |
| 5,694,511 | A | 12/1997 | Pimpinella et al. |
| 5,708,751 | A | 1/1998 | Mattei |
| 5,717,810 | A | 2/1998 | Wheeler |
| 5,724,469 | A | 3/1998 | Orlando |
| 5,731,546 | A | 3/1998 | Miles et al. |
| 5,734,776 | A | 3/1998 | Puetz |
| 5,751,882 | A | 5/1998 | Daems et al. |
| 5,758,004 | A | 5/1998 | Alarcon et al. |
| 5,764,843 | A | 6/1998 | Macken et al. |
| 5,774,612 | A | 6/1998 | Belenkiy et al. |
| 5,775,648 | A | 7/1998 | Metzger |
| 5,778,132 | A | 7/1998 | Csipkes et al. |
| 5,781,678 | A | 7/1998 | Sano et al. |
| 5,793,920 | A | 8/1998 | Wilkins et al. |
| 5,793,921 | A | 8/1998 | Wilkins et al. |
| 5,796,908 | A | 8/1998 | Vicory |
| 5,802,237 | A | 9/1998 | Pulido |
| 5,810,461 | A | 9/1998 | Ive et al. |
| 5,816,081 | A | 10/1998 | Johnston |
| 5,823,646 | A | 10/1998 | Arizpe et al. |
| 5,825,955 | A | 10/1998 | Ernst et al. |
| 5,825,961 | A | 10/1998 | Wilkins et al. |
| 5,832,162 | A | 11/1998 | Sarbell |
| 5,835,657 | A | 11/1998 | Suarez et al. |
| 5,835,658 | A | 11/1998 | Smith |
| 5,862,290 | A | 1/1999 | Burek et al. |
| 5,867,621 | A | 2/1999 | Luther et al. |
| 5,870,519 | A | 2/1999 | Jenkins et al. |
| 5,880,864 | A | 3/1999 | Williams et al. |

(56) References Cited

U.S. PATENT DOCUMENTS

| | | |
|---|---|---|
| 5,881,200 A | 3/1999 | Burt |
| 5,883,995 A | 3/1999 | Lu |
| 5,884,002 A | 3/1999 | Cloud et al. ............ 385/135 |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | Buabbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 * | 10/2001 | Daems et al. ............ 385/135 |
| 6,307,997 B1 | 10/2001 | Walters et al. |
| 6,307,998 B2 | 10/2001 | Williams |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,710,366 B1 | 3/2004 | Lee et al. |
| 6,711,339 B2 | 3/2004 | Puetz et al. |
| 6,715,619 B2 | 4/2004 | Kim et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B2 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |

(56) References Cited

U.S. PATENT DOCUMENTS

| | | |
|---|---|---|
| 6,880,982 B2 | 4/2005 | Imamura |
| 6,885,798 B2 | 4/2005 | Zimmel |
| 6,915,058 B2 | 7/2005 | Pons |
| 6,915,059 B2 | 7/2005 | Daoud et al. |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,932,514 B2 | 8/2005 | Anderson et al. |
| 6,934,451 B2 | 8/2005 | Cooke et al. |
| 6,937,807 B2 | 8/2005 | Franklin et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Hertz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 | 10/2006 | Scherer et al. |
| 7,130,519 B2 | 10/2006 | Grubish et al. |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,349,616 B1 | 3/2008 | Castonguay et al. |
| 7,369,741 B2 | 5/2008 | Reagan et al. |
| 7,376,325 B1 | 5/2008 | Cloud et al. |
| 7,379,650 B2 | 5/2008 | Weinert et al. |
| 7,406,241 B1 | 7/2008 | Opaluch et al. |
| 7,412,145 B2 | 8/2008 | Honma et al. |
| 7,418,182 B2 * | 8/2008 | Krampotich ............... 385/135 |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,509,016 B2 * | 3/2009 | Smith et al. ............... 385/135 |
| 7,522,805 B2 | 4/2009 | Smith et al. |
| 7,526,174 B2 | 4/2009 | Leon et al. |
| 7,609,967 B2 | 10/2009 | Hochbaum et al. |
| 7,613,376 B2 | 11/2009 | Wright et al. |
| 7,636,507 B2 | 12/2009 | Lu et al. |
| 7,664,361 B2 | 2/2010 | Trebesch et al. |
| 7,690,848 B2 | 4/2010 | Faika et al. |
| 7,766,732 B2 | 8/2010 | Hauville |
| 7,769,265 B2 | 8/2010 | Cairns |
| 7,822,310 B2 | 10/2010 | Castonguay et al. |
| 7,844,161 B2 | 11/2010 | Reagan et al. |
| 7,889,961 B2 | 2/2011 | Cote et al. |
| 7,970,249 B2 * | 6/2011 | Solheid et al. ............... 385/135 |
| 7,974,509 B2 | 7/2011 | Smith et al. |
| 8,086,085 B2 | 12/2011 | Lu et al. |
| 8,265,447 B2 | 9/2012 | Loeffelholz et al. |
| 8,351,754 B2 | 1/2013 | Bell |
| 8,380,036 B2 | 2/2013 | Smith |
| 8,437,595 B2 | 5/2013 | Womack et al. |
| 8,465,317 B2 | 6/2013 | Gniadek et al. |
| 8,467,651 B2 | 6/2013 | Cao et al. |
| 8,712,206 B2 | 4/2014 | Cooke et al. |
| 2001/0001270 A1 | 5/2001 | Williams Vigliaturo |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210229 A1 | 9/2006 | Scadden |

(56) References Cited

U.S. PATENT DOCUMENTS

| | | |
|---|---|---|
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0104447 A1 | 5/2007 | Allen |
| 2007/0114339 A1 | 5/2007 | Winchester |
| 2007/0183732 A1 | 8/2007 | Wittmeier et al. |
| 2007/0263962 A1 | 11/2007 | Kohda |
| 2007/0274718 A1 | 11/2007 | Bridges et al. |
| 2008/0008437 A1 | 1/2008 | Reagan et al. |
| 2008/0063350 A1 | 3/2008 | Trebesch et al. |
| 2008/0085094 A1 | 4/2008 | Krampotich |
| 2008/0131067 A1 | 6/2008 | Ugolini et al. |
| 2008/0138026 A1 | 6/2008 | Yow et al. |
| 2008/0145008 A1 | 6/2008 | Lewallen et al. |
| 2008/0193091 A1 | 8/2008 | Herbst |
| 2008/0205844 A1 | 8/2008 | Castonguay et al. |
| 2008/0253723 A1 | 10/2008 | Stokes et al. |
| 2008/0259928 A1 | 10/2008 | Chen et al. |
| 2008/0292261 A1 | 11/2008 | Kowalczyk et al. |
| 2008/0317425 A1 | 12/2008 | Smith et al. |
| 2009/0022470 A1 | 1/2009 | Krampotich |
| 2009/0034929 A1 | 2/2009 | Reinhardt et al. |
| 2009/0060440 A1 | 3/2009 | Wright et al. |
| 2009/0097813 A1 | 4/2009 | Hill |
| 2009/0103865 A1 | 4/2009 | Del Rosso |
| 2009/0103878 A1 | 4/2009 | Zimmel |
| 2009/0208210 A1 | 8/2009 | Trojer et al. |
| 2009/0245746 A1 | 10/2009 | Krampotich et al. |
| 2009/0252462 A1 | 10/2009 | Bonical |
| 2009/0263122 A1 | 10/2009 | Helkey et al. |
| 2009/0274429 A1 | 11/2009 | Krampotich et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0061693 A1 | 3/2010 | Bran de Leon et al. |
| 2010/0183274 A1 | 7/2010 | Brunet et al. |
| 2010/0290753 A1 | 11/2010 | Tang et al. |
| 2011/0052133 A1 | 3/2011 | Simmons et al. |
| 2011/0097052 A1 | 4/2011 | Solheid et al. |
| 2011/0158599 A1 | 6/2011 | Kowalczyk et al. |
| 2012/0104145 A1 | 5/2012 | Dagley et al. |
| 2012/0301096 A1 | 11/2012 | Badar et al. |
| 2012/0308190 A1 | 12/2012 | Smith et al. |
| 2013/0034333 A1 | 2/2013 | Holmberg et al. |

FOREIGN PATENT DOCUMENTS

| | | | |
|---|---|---|---|
| DE | 4240727 C1 | 2/1994 | |
| DE | 29800194 U1 | 3/1998 | |
| DE | 29800194 U1 | 4/1998 | ............... G02B 6/36 |
| DE | 10005294 A1 | 8/2001 | |
| DE | 10238189 A1 | 2/2004 | |
| DE | 202004011493 U1 | 9/2004 | |
| DE | 20320702 U1 | 10/2005 | |
| DE | 202005018884 U1 | 2/2006 | |
| DE | 202007000556 U1 | 10/2007 | |
| DE | 202007012420 U1 | 10/2007 | |
| DE | 202010009385 U1 | 9/2010 | |
| EP | 0409390 A2 | 1/1991 | |
| EP | 0410622 A2 | 1/1991 | |
| EP | 0415647 A2 | 3/1991 | |
| EP | 0490644 A1 | 6/1992 | |
| EP | 0541820 A1 | 5/1993 | |
| EP | 0593927 A1 | 4/1994 | |
| EP | 0720322 A2 | 7/1996 | |
| EP | 0725468 A1 | 8/1996 | |
| EP | 0828356 A2 | 3/1998 | |
| EP | 0840153 A2 | 5/1998 | |
| EP | 0928053 A2 | 7/1999 | |
| EP | 1107031 A1 | 6/2001 | |
| EP | 1120674 A1 | 8/2001 | |
| EP | 1179745 A2 | 2/2002 | |
| EP | 1203974 A2 | 5/2002 | |
| EP | 1316829 A2 | 6/2003 | |
| EP | 1621907 A1 | 2/2006 | ............... G02B 6/44 |
| EP | 1944635 A2 | 7/2008 | |
| EP | 1944886 A1 | 7/2008 | |
| EP | 2060942 A2 | 5/2009 | |
| EP | 2141527 A2 | 1/2010 | |
| FR | 2123728 A5 | 9/1972 | |
| FR | 2748576 A1 | 11/1997 | |
| GB | 2254163 A | 9/1992 | |
| JP | 59107317 A | 6/1984 | |
| JP | 6227312 A | 8/1994 | |
| JP | 11125722 A | 5/1999 | |
| JP | 11231163 A | 8/1999 | |
| JP | 2001116968 A | 4/2001 | |
| JP | 2004061713 A | 2/2004 | |
| WO | 8805925 A1 | 8/1988 | |
| WO | 8905989 A1 | 6/1989 | |
| WO | 9507484 A1 | 3/1995 | |
| WO | 9630791 A1 | 10/1996 | |
| WO | 9638752 A1 | 12/1996 | |
| WO | 9722025 A1 | 6/1997 | |
| WO | 9725642 A1 | 7/1997 | |
| WO | 9736197 A1 | 10/1997 | |
| WO | 0221186 A1 | 3/2002 | |
| WO | 02099528 A1 | 12/2002 | |
| WO | 03009527 A2 | 1/2003 | |
| WO | 03093889 A1 | 11/2003 | |
| WO | 2004086112 A1 | 10/2004 | |
| WO | 2005020400 A1 | 3/2005 | |
| WO | 2005050277 A2 | 6/2005 | |
| WO | 2005088373 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007089682 A2 | 8/2007 | |
| WO | 2007129953 A1 | 11/2007 | |
| WO | 2008033997 A1 | 3/2008 | |
| WO | 2008048935 A2 | 4/2008 | |
| WO | 2008137894 A1 | 11/2008 | |
| WO | 2009029485 A1 | 3/2009 | |

OTHER PUBLICATIONS

Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.

(56) References Cited

OTHER PUBLICATIONS

Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.
Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Non-final Office Action for U.S. Appl. No. 13/083,110 mailed Mar. 18, 2014, 14 pages.
Non-final Office Action for U.S. Appl. No. 13/089,692 mailed Jan. 13, 2014, 8 pages.
Advisory Action for U.S. Appl. No. 13/613,759 mailed Apr. 7, 2014, 3 pages.
Non-final Office Action for U.S. Appl. No. 13/649,377 mailed Jan. 31, 2014, 5 pages.
International Search Report for PCT/US2011/030446 mailed Jul. 14, 2011, 3 pages.
International Search Report for PCT/US2011/030448 mailed Jul. 20, 2011, 5 pages.
International Search Report for PCT/US2011/030466 mailed Aug. 5, 2011, 4 pages.
Non-final Office Action for U.S. Appl. No. 13/479,846 mailed Sep. 13, 2013, 11 pages.
Non-final Office Action for U.S. Appl. No. 13/613,759 mailed Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 mailed Dec. 26, 2013, 25 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 13/087,765 mailed Sep. 18, 2013, 8 pages.
Final Office Action for U.S. Appl. No. 13/479,846 mailed Feb. 14, 2014, 11 pages.
Final Office Action for U.S. Appl. No. 13/613,759 mailed Jan. 27, 2014, 13 pages.
Advisory Action for U.S. Appl. No. 10/804,958 mailed Jun. 26, 2014, 4 pages.
Notice of Allowance for U.S. Appl. No. 11/975,440 mailed Apr. 30, 2014, 8 pages.
Final Office Action for U.S. Appl. No. 12/072,187 mailed May 27, 2014, 27 pages.
Non-final Office Action for U.S. Appl. No. 13/089,692 mailed May 5, 2014, 7 pages.
Advisory Action for U.S. Appl. No. 13/479,846 mailed May 8, 2014, 3 pages.
Non-final Office Action for U.S. Appl. No. 13/537,753 mailed Mar. 27, 2014, 7 pages.
Non-final Office Action for U.S. Appl. No. 13/601,245 mailed Mar. 27, 2014, 8 pages.
Final Office Action for U.S. Appl. No. 13/649,377 mailed May 29, 2014, 8 pages.
Notice of Allowance for U.S. Appl. No. 11/595,723 mailed Dec. 28, 2010, 8 pages.
Non-final Office Action for U.S. Appl. No. 11/595,723 mailed Jun. 21, 2010, 9 pages.
Non-final Office Action for U.S. Appl. No. 11/595,723 mailed Jan. 5, 2010 9 pages.
Advisory Action for U.S. Appl. No. 11/595,723 mailed Nov. 24, 2009, 3 pages.
Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.

(56) References Cited

OTHER PUBLICATIONS

Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Advisory Action for U.S. Appl. No. 13/275,798 mailed Sep. 12, 2013, 2 pages.
Final Office Action for U.S. Appl. No. 13/089,692 mailed Aug. 13, 2014, 8 pages.
Examiner's Answer to the Appeal Brief for U.S. Appl. No. 13/275,798 mailed Aug. 26, 2014, 6 pages.
Notice of Allowance for U.S. Appl. No. 13/537,753 mailed Aug. 21, 2014, 7 pages.
Examiner's Answer to the Appeal Brief for U.S. Appl. No. 13/613,759 mailed Aug. 18, 2014, 6 pages.

* cited by examiner

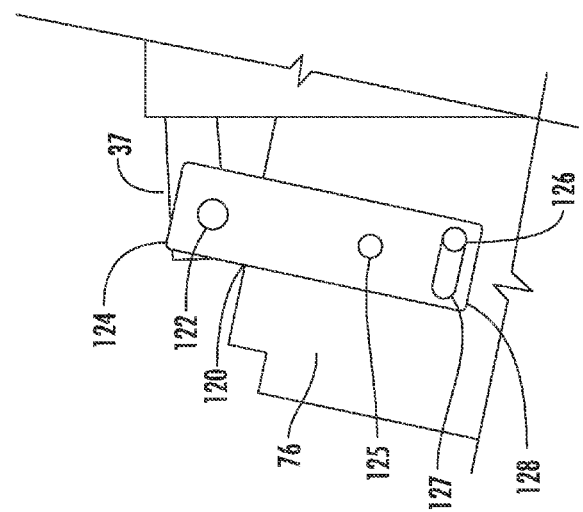
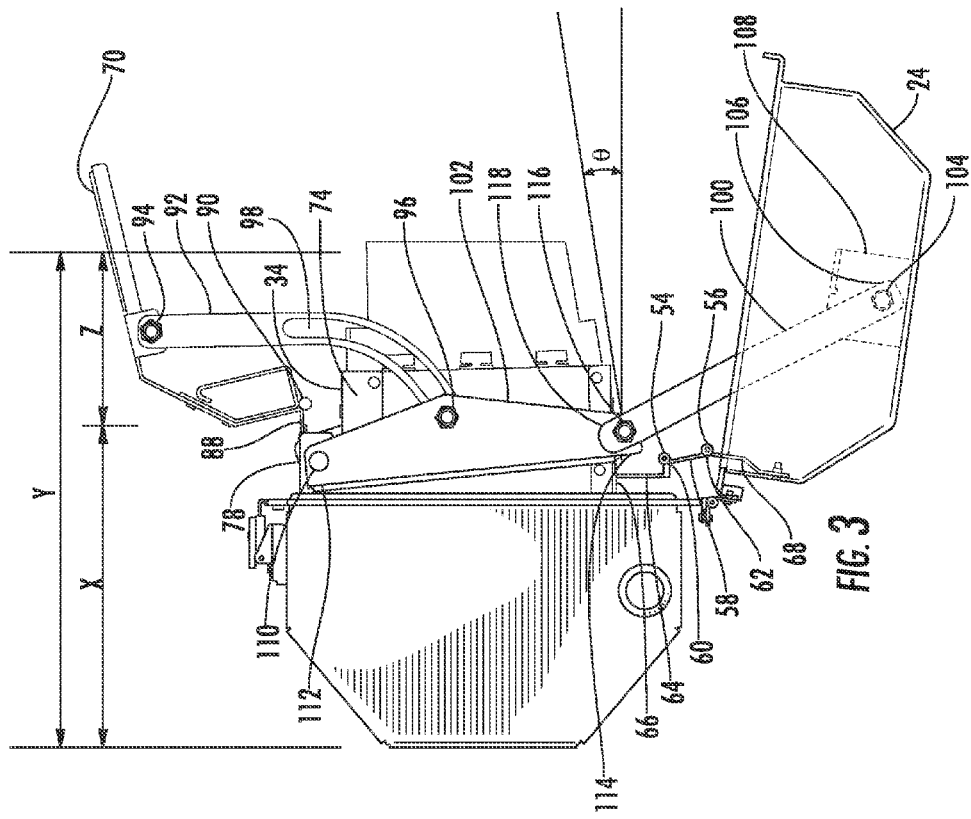

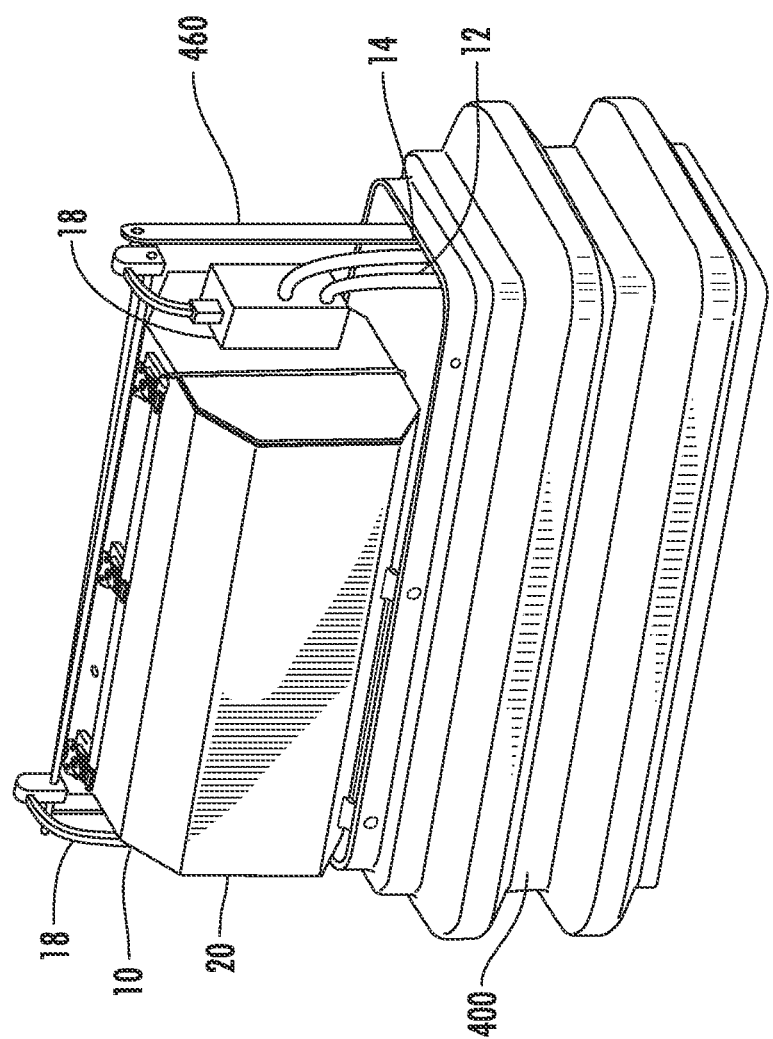

VARIABLY CONFIGURABLE AND MODULAR LOCAL CONVERGENCE POINT

CROSS-REFERENCE TO RELATED APPLICATIONS

This application is a continuation of International Application No. PCT/US09/62266, filed Oct. 27, 2009, which claims the benefit of U.S. Provisional Application Ser. No. 61/108,788, filed Oct. 27, 2008, the contents of both of which are relied upon and incorporated herein by reference in their entireties.

BACKGROUND

1. Field of the Invention

The present invention relates generally to fiber optic terminals, and more particularly to a fiber optic terminal which provide a local convergence point between a service provider and a subscriber in a fiber optic network that has a small form factor and is variably configurable and modular.

2. Technical Background

Fiber optic terminals in a fiber optic network may be referred to as local convergence points (LCP), fiber distribution terminals (FDT), fiber distribution hubs (FDH), and the like. Such fiber optic terminals are typically cabinets or enclosures which may house fiber connection points, splices and splitters. The splitters split an optical signal from a network operator or service provider into many optical signals for distribution to subscribers. This enables the transmission of optical signals over optical fibers connected to the terminals and extended towards the subscriber premises in the optical networks. Thus, the fiber optic terminal provides a convergence point for the fibers and the optical signals between the network operator or service provider and the subscriber. The convergence point offers management capabilities to the network operator or service provider. However, current fiber optic terminals lack features and design which would be beneficial in deploying an all-fiber access network, especially for broadband service providers, such as cable TV companies, and others, including, but not limited to, telcos, CLECs and municipalities.

SUMMARY OF THE DETAILED DESCRIPTION

Embodiments disclosed herein include a fiber optic terminal as a local convergence point in a fiber optic network. The fiber optic terminal has an enclosure having a base and a cover which define an interior space. A feeder cable having at least one optical fiber and a distribution cable having at least one optical fiber are received into the interior space through a feeder cable port and a distribution cable port, respectively. A movable chassis positions in the interior space and is movable between a first position, a second position and third position. The movable chassis has a splitter holder area, a cassette area and a parking area. At least one cassette movably positions in the cassette area. A splitter module holder having a splitter module movably positioned therein movably positions in the splitter holder area. The optical fiber of the feeder cable and the optical fiber of the distribution cable are optically connected through the cassette. The optical connection between the optical fiber of the feeder cable and the optical fiber of the distribution cable may be made through the splitter module. In such case, the optical fiber of the feeder cable optically connects to an input optical fiber of the splitter module, where the optical signal is split into a plurality of output optical signals carried by output optical fibers in the form of splitter legs. One of the plurality of output optical fibers or splitter legs connects to the optical fiber of the distribution cable for distribution towards a subscriber premises. Additionally, one of the output fibers or splitter legs may connect to a connector holder in the parking area. The interior space is variably configurable by changeably positioning at the least one cassettes and the splitter modules in the movable chassis. The at least one cassette may be a feeder cassette and/or a distribution cassette.

When the enclosure is closed, the movable chassis positions in the first position. In the first position, the movable chassis positions in the base adjacent to a back of the base. When the enclosure is opened, the movable chassis automatically moves from the first position to the second position In the second position, the movable chassis is partially extended from the base and tilted away from the cover. The second position facilitates access to the cassettes and the splitter modules. Also when the enclosure is open, the movable chassis may position in the third position. In the third position, the movable chassis positions in the cover. When the movable chassis is in the third position, access to a fiber management area in the base is provided.

A protective shield movably attaches to the movable chassis. The protective shield rotates or pivots between a covered position and a raised position. In the covered position, the protective shield covers at least a portion of the movable chassis including the splitter module holder, the feeder cassettes, the distribution cassettes, and the parking area.

BRIEF DESCRIPTION OF THE FIGURES

FIG. 3 is a left side elevation of the fiber optic terminal of FIG. 1 illustrating a connection assembly between the cover, the movable chassis and a base of the fiber optic terminal and the movable chassis in an extended position;

FIG. 4 is a partial detail of a right side elevation of the fiber optic terminal of FIG. 1 illustrating the connection assembly between the movable chassis and the base;

FIG. 25 is a front, elevation view of the fiber optic terminal of FIG. 1 mounted on a "dog-house" style support using the hanger attachment assembly to suspend the fiber optic terminal from a suspended bar frame;

DETAILED DESCRIPTION

Figure 1:
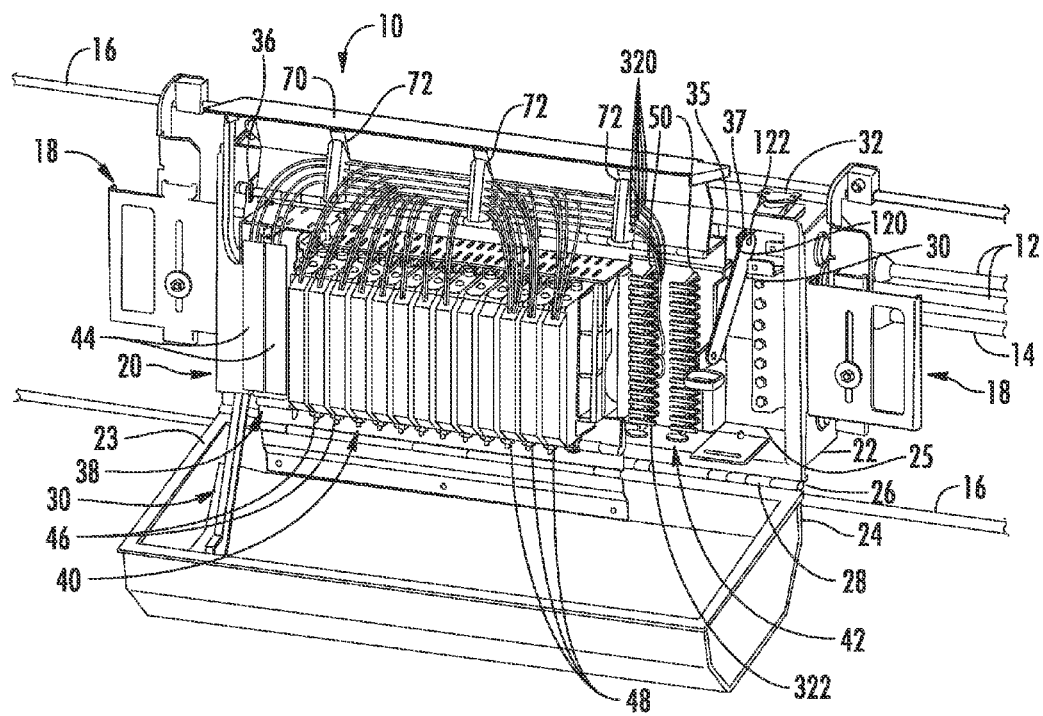
FIG. 1 is a front, perspective view of an exemplary embodiment of a fiber optic terminal installed in an aerial environment from a strand with the cover opened showing splice holder modules, feeder cassettes, distribution cassettes, connector holder block mounted in a movable chassis; and other components located therein.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include a fiber optic terminal, which may also be referred to as a local convergence point (LCP), a fiber distribution hub (FDH), a fiber distribution terminal (FDT), or the like, that is a highly versatile package with easy access to optical fiber and optical components routed to and/or positioned in the fiber optic terminal for subscriber configuration. The optical components may include but not be limited to, splice trays, splice holders, optical signal power and wavelength managing components, including, without limitation, splitter modules, wave division multiplexers/demultiplexers (WDM), and the like, fiber optic connection modules, connector holder blocks, connector holders, fiber optic adapters and connectors, routing guides, and/or routing clips. Additionally, the term "splitter module" as used herein should be under stood to include any form of optical power splitting, coupling, or wavelength managing device, including without limitation, a passive optical splitter, fused biconic taper coupler (FBT) wave length division multiplexer/demultiplexer (WDM), coarse wavelength division multiplexer/demultiplexer (CWDM), dense wave division multiplexer/demultiplexer (DWDM), and the like.

The fiber optic terminal may comprise a shell or other enclosure that defines an interior space and at least one cable entry port. The fiber optic terminal may be configured to receive through the at least one entry port at least one optical feeder cable comprising one or more optical fibers. The term "feeder cable" as used herein should be understood to include, without limitation, a transport cable, a back haul cable, and the like. Also, the fiber optic terminal may be configured to receive through another one of the at least one entry port at least one optical distribution cable comprising one or more optical fibers. The term "distribution cable" as used herein should be understood to include, without limitation, a branch cable, a drop cable, and the like. An optical connection may be established between the one or more optical fibers in the feeder cable and the one or more optical fibers in the distribution cable through at least one connection module. The terms "connection module" and "cassette" may be used interchangeably, and as used herein should be understood to include any module, cassette, panel, or the like, used for interconnecting optical fibers. Thus, an optical signal carried by the optical fiber in the feeder cable from a service provider' central office, switching station, head end, or the like, may also be carried by an optical fiber in the distribution cable and extended to a subscriber's premises. Additionally, the fiber optic terminal may be configured to establish an optical connection between one or more feeder cables and/or between one or more distribution cables through at least one fiber optic connection module. In this manner, optical connectivity may be established between the service provider and the subscriber in an FTTX fiber optic network employing different network architectures.

The splitter modules and connection modules positioned inside the enclosure may be variably configurable as desired. In this way, the fiber optic terminal may be configured to have a size and cost compatible with any size, design, or architecture of the fiber optic network. As a non-limiting example, the fiber optic terminal may be configured for a centralized splitting architecture in which a splitter module splits the optical signal on one of the optical fibers of the feeder cable into multiple optical signals for distribution on optical fibers of a distribution cable to subscriber premises. Alternatively or additionally, the fiber optic terminal may be configured for a distributed split architecture in which a splitter module splits the optical signal on one of the optical fibers of the feeder cable into multiple optical signals which are then transmitted to one or more other fiber optic terminals for additional splitting before distribution to subscriber premises. In this way, the fiber optic terminal may be initially configured for smaller subscriber premises groups, such as small housing developments and phases of developments, so that the subscriber premises in the development may be connected cost effectively. However, because the fiber optic terminal is modular, the fiber optic terminal may subsequently be re-configured for larger developments, and may be connected by including additional components in the housing. As another non-limiting example, the fiber optic terminal may be configured as one of multiple fiber optic terminals interconnected in a ring topology used to enable transmission of different wavelengths of the optical signal over a multiplexed distribution portion of the fiber optic network. A CWDM or DWDM may be used as an add/drop multiplexer to drop and add wavelengths at one or more of the fiber optic terminals in the ring topology. Additionally, and as yet another non-limiting example, the fiber optic terminal may be configured without splitter module function, and used as a cross-connect and/or interconnect device. Furthermore, any type of optical or electronic, active or passive component may be positioned in the interior space of the fiber optic terminal. In this manner, the fiber optic terminal may be configured exactly to the application, avoiding the cost of unneeded components and functionality.

Further, the fiber optic terminal is designed to be versatile such that it can be universally mounted in different environments without modification or re-design. In this regard, the fiber optic terminal may be mounted on a strand, a wall, a pole, a pedestal, a rack or in a "dog-house" to provide compatibility with service providers, including cable service providers, current mounting preferences. Additionally, the fiber optic terminal may be sealed to allow for below-ground installation. Other benefits of the fiber optic terminal being variably configurable and modular are that only a limited number of parts have to be stocked and the needed configuration may be performed in the field. Also, internal splice capability, especially in a sealed package, may be provided without the need for additional enclosures. Thus, the fiber optic terminal may obviate the need for an external enclosure to splice cable stubs, reducing costs.

The fiber optic terminal may be worked on at ground level and then placed on an aerial strand, or lifted from a pedestal/hand hole and worked on nearby. When the work is completed the fiber optic terminal may be placed on the strand or pedestal/hand hole. In this way, the fiber optic terminal may be worked on in the horizontal and vertical position. Thus, there may be no need to take the fiber optic terminal down or move it, except to lift it from a hand hole, to make routing connections, perform testing, etc.

The fiber optic terminal may be used outside or indoors, for example, in a multiple dwelling unit (MDU) application. Feeder cable and distribution cable optical fibers may reside in the same cables in links to and between fiber optic terminals, saving on installation costs. These may be managed separately in the interior space of the fiber optic terminal by keeping feeder and distribution fibers in separate buffer tubes or ribbons. The fiber optic terminal may provide for grounding and bonding of armored cables and those with metallic elements. The grounding may be simple common grounding or one that provides for toning of the metallic elements being grounded. The fiber optic terminal provides capacity and versatility in a small form factor and in the manner in which it can be mounted accessed and connected.

The fiber optic terminal may be manufactured from any type of material, including, but not limited to, plastic and/or metal. Additionally, the fiber optic terminal may comprise an enclosure having at least two sections that define and/or allow the enclosure to define an interior space. The sections may be a base and a cover hingedly connected so that the enclosure may be opened or closed by rotating one or more of the base and the cover to allow access to the interior space. When closed the base and the cover may meet. The enclosure may then be sealed against the environment by appropriate latching mechanisms and/or sealing material. Additionally, an extension or lip may be formed on the enclosure. The extension and/or lip may be hingedly attached to the section and extend at least a portion of the length of the enclosure. When enclosure is closed, the extension or lip may extend over the interface between the base and cover for rain and/or water tight protection of the enclosure.

The fiber optic terminal may have other features and attributes, including but not limited to, a separate enclosure splice tray, which may allow for concatenating multiple fiber optic terminals together by splicing another feeder cable section to excess fibers of the feeder cable. In this way, multiple fiber optic terminals may be concatenated or series connected to cover a wider serving area with the smaller aesthetic foot print or form factor. The fiber optic terminal may be configured to accept stubbed and non-stubbed, internally spliced and preconnectorized cables and is able to accommodate different cable entries in the same fiber optic terminal. The feeder cable and the distribution cable may enter the fiber optic terminal from one side in a butt configuration or from both sides. Thus, the entry ports of the fiber optic terminal may have hubs and/or grommets allowing the feeder cables and/or the distribution cables to enter directly into the fiber optic terminal. Alternatively or additionally, the entry ports may have fiber optic adapters seated therein to provide for the fiber optic cables to optically connect at the enclosure with optical fibers routed within the fiber optic terminals. Thus, the feeder cables and/or distribution cables may enter the enclosure of the fiber optic terminal as raw cables or interconnect with the fiber optic terminal as connectorized/preconnectorized cable. In this manner, the fiber optic terminal may accept field-installed connectors or pre-connectorized connectors, such as the MTP, OptiTap™ and OptiTip™ fiber optic connectors as from Corning Cable Systems LLC of Hickory, N.C. to name just a few.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

A movable chassis adapted to hold one or more splitter modules, cassettes and/or a parking area may be positioned within the fiber optic terminal. The movable chassis provides an internal interior space that nests within the interior space of the enclosure. The splitter module may be movably positioned in splitter module holder, which may then be movably positioned in the movable chassis. Splitter legs output from the splitter module may be parked in a connector holder in the parking area until needed to connect a subscriber. When a subscriber is connected, an available splitter leg may be routed from the parking area storing any slack on routing guides. The splitter leg may be connected to a designated fiber optic adapter in one of the cassettes. The fiber optic adapter in the cassette may be configured to provide optical connection between connectors inserted in the adapter. Splitter legs may be kept short to facilitate management and avoid entanglement.

The fiber optic terminal may be configured for any number of subscriber premises. This may be accomplished by the number and type of the splitter modules and the cassettes. The splitter modules may provide for equal splits or for unequal splits, and/or may be optical power or wavelength division multiplexer/demultiplexer type. For example, if the fiber optic terminal is to address 128 subscriber premises, then, four 1×32 splitter modules may be used. If the number of subscriber premises increases, then additional splitter modules may be added. Additionally, any other quantity or optical signal split multiple splitter modules may be used, including without limitation, 1×4, 1×8, and 1×16, or any other 1×N optical signal split multiple. Additionally, other signal split multiples may be uses, for example, without limitation, a 2×N splitter, which may be used to provide or redundant feeder optical signal. Further, the quantity and type of the cassette may be increased or decreased to address the specific optical network requirements. As example, the cassette may be a feeder cassette or a distribution cassette. The feeder cassette and distribution cassette may use a single platform or frame to allow for interchangeability. Also, the feeder cassette and distribution cassette may be variably configurable by inserting one or more components for the intended function, such as for splicing or multi-fiber connection, as examples. Thus, the feeder cassettes and distribution cassettes may function as both a connector panel and as a splice tray. The movable chassis may be configured to allow for pass-though optical fibers and other inefficiencies in areas that may not have uniformly grouped subscriber premises.

In this regard, FIG. 1 illustrates a fiber optic terminal 10 according to one embodiment of the disclosure. The fiber optic terminal 10 provides a convenient access and local convergence point in a telecommunications or data network for a field technician to install, configure and reconfigure optical fiber connections between feeder cables and distribution cables. The fiber optic terminal 10 is configured to allow one or more optical fibers provided in one or more feeder cables 12 to be easily and readily interconnected with one or more optical fibers in one or more distribution cables 14. The feeder cables 12 may also be referred to as "upstream" or "network-side" cables. The distribution cables 14 may also be referred to as "downstream" or "subscriber-side" cables. By the terms "upstream" or "network-side" it is meant that the optical fiber, fiber optic cable, or optical connection, as the case may be, are provided between a central switching point, central office, head end or the like and the fiber optic terminal 10. By the terms "downstream" or "subscriber-side," it is meant that optical fiber, fiber optic cable, or optical connection, as the case may be, are provided between the end subscriber and the fiber optic terminal 10.

In the embodiment shown in FIG. 1 the fiber optic terminal 10 is depicted in an aerial installation, but the fiber optic terminal 10 may be installed in other installation environments, as will be further discussed herein. In the aerial installation illustrated in FIG. 1, the fiber optic terminal is suspended from a strand 16. The strand may be one strung between two supports, such as, for example, utility poles (not shown), to provide an elevated, out-of-the-way and secured installation for the fiber optic terminal 10, but one still easily accessible by a field technician or other authorized personnel. In such a case, the fiber optic terminal 10 may be suspended from the strand 16 by an attachment assembly in the form of a hanger bracket assembly 18. Two hanger bracket assemblies 18 may be included with one each of the hanger bracket assemblies 18 located at either side of the fiber optic terminal 10. The hanger bracket assemblies 18 allow the fiber optic terminal 10 to be adjustably mounted in a suspended orientation to a strand or other overhead support (See FIG. 21). As will be discussed herein, other attachment assemblies may be used to mount the fiber optic terminal in other installation environments. Another strand 16 is shown in FIG. 1 below the fiber optic terminal 10. Typically, strands 16 may be strung with approximately 12 inches separating each stand. In the embodiment shown in FIG. 1, the fiber optic terminal 10 is constructed to fit between the two strands 16.

Figure 6:
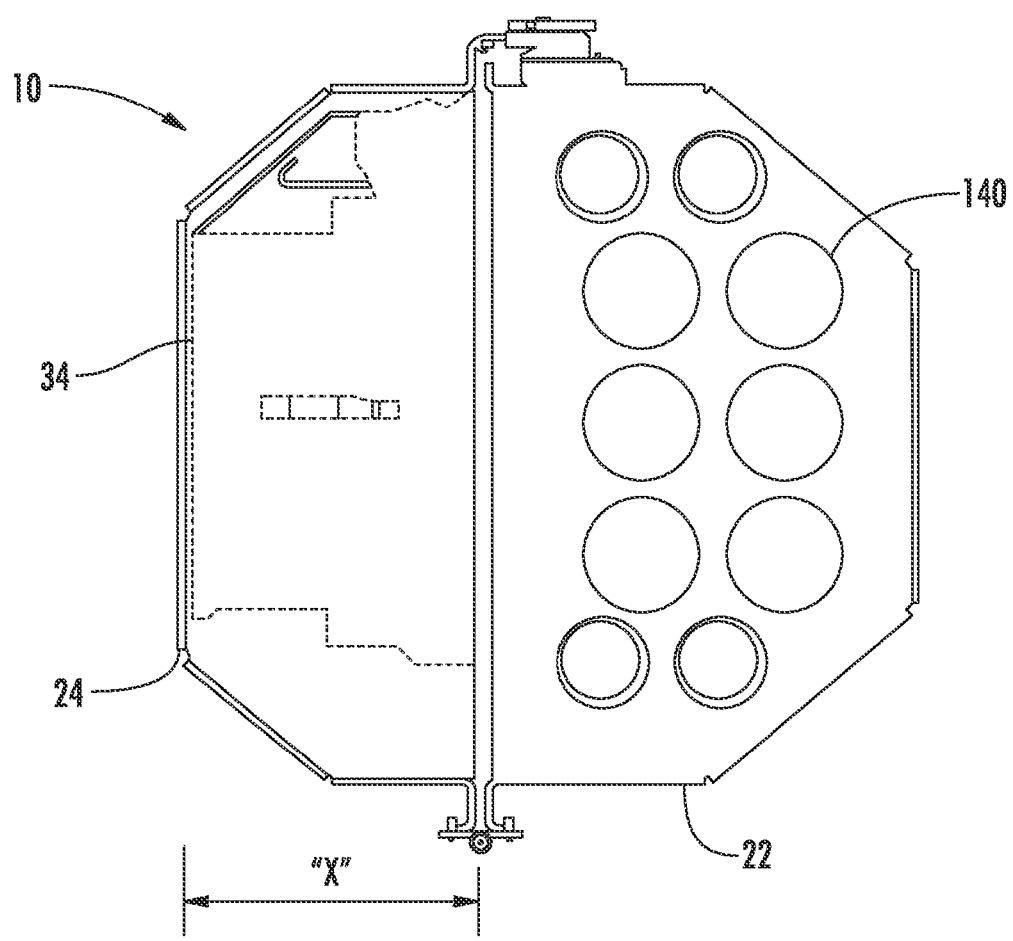
FIG. 6 is a right side elevation of the fiber optic terminal of FIG. 1 with the cover closed illustrating the arrangement of the movable chassis in a base position.

The fiber optic terminal illustrated in FIG. 1 comprises an enclosure 20 having a base 22 and a cover 24 hingedly affixed to the base 22 and opened thereon and defining an interior space 25. The base 22 and the cover 24 may be made of a rigid material, such as aluminum, or other metal, plastic, or thermoplastic, as examples. The base 22 and the cover 24 serve to close off and protect the internal components of the fiber optic terminal 10 when the cover 24 is closed on the base 22, as illustrated in FIG. 6. With reference to FIG. 1, the enclosure 20 in this embodiment is a generally elongated rectangular small form factor structure. The enclosure 20 may be equivalent in size to a splice closure, but have easy ingress and egress similar to larger cabinets. In one embodiment, the enclosure 20 may have an overall length of about 22 inches, an overall width of about 9.5 inches, and an overall height of about 10 inches. The fiber optic terminal 10 may be mounted on standard aerial strand and pedestal installations. However, other sizes and shapes are possible. The cover 24 may be hingedly affixed to the base 22 along a lower edge 26 by cover hinge 28. In this manner, the cover 24 can be rotated about the cover hinge 28 when the cover 24 is opened from the base 22. To limit the amount of opening of the terminal cover 24 from the base 22, a connection assembly 30 may be attached between the cover 24 and the base 22 (see FIGS. 3 and 4). The connection assembly 30 may be provided in the form of one or more brackets having a defined geometry, length and interconnection design to limit the opening of the cover 24 and provide other functions as further discussed herein. A gasket 23 or other type of weather/environmental seal may be placed on an interface or edge of the enclosure 20 at which the base 22 and the cover 24 meet when closed. In this way, the fiber optic terminal 10 may be used in outdoor and buried applications. Additionally, when the cover 24 is closed on to the base 22, the cover 24 may be secured to the base 22 by one or more fasteners 32, which in FIG. 1 are shown in the form of draw latches. Any other type or form of fastener may be used including for example bolts, screws, or the like.

Figure 2:
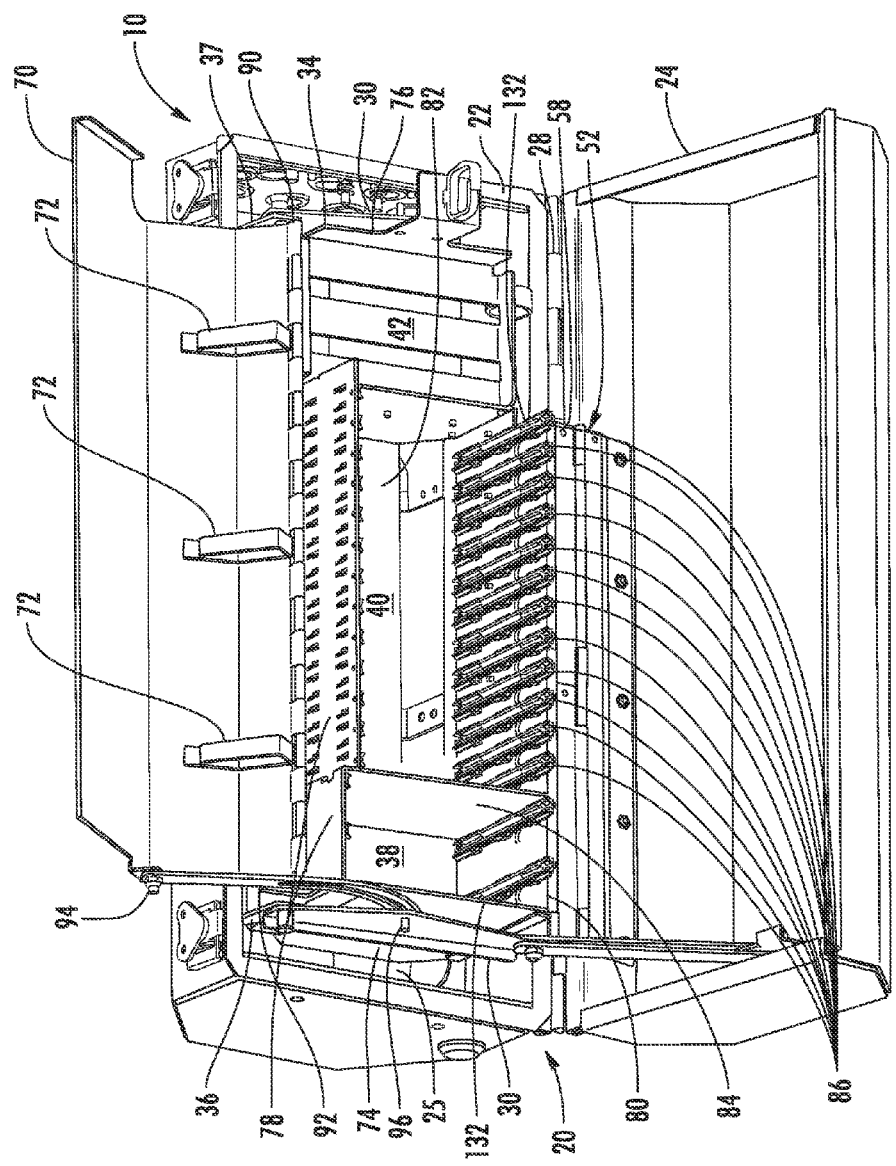
FIG. 2 is a front, perspective view of the fiber optic terminal of FIG. 1, with the optical components removed to illustrate guide rails used to mount the splice holder modules, feeder cassettes, distribution cassettes in the movable chassis, and a parking area for mounting the connector holder block in the movable chassis.

Continuing with reference to FIG. 1 and also to FIGS. 2 and 3, a movable chassis 34 positions in the interior space 25 of the fiber optic terminal 10 and attaches to the enclosure via enclosure brackets 36, 37 and the connection assembly 30. The movable chassis 34 may align with the interior space 25 in such a way as to be "nested" within the interior space 25, thereby providing an internal space in the interior space 25. The movable chassis 34 comprises a splitter holder area 38, a cassette area 40 and a parking area 42. This allows the movable chassis 34 to be able to support one or more splitter module holders 44, movably positioned in the splitter holder area 38, and one or more feeder cassettes 46 and/or distribution cassettes 48, movably positioned in the cassette area 40. Connector holder blocks 50 having connector holders 322 for receiving the connectorized splitter legs 320 may position in the parking area 42.

A double hinge assembly 52 attaches between the movable chassis 34 and the cover 24. The double hinge assembly 52 includes a first chassis hinge 54 and a second chassis hinge 56 connected by a hinge plate 58. The first chassis hinge 54 connects to the hinge plate 58 at a first plate edge 60, while the second chassis hinge 56 connects to the hinge plate 58 at a second plate edge 62, opposite the first plate edge 60. A bottom hinge mount 64 extends from the chassis bottom 66 and attaches to the double hinge assembly 52 at the first chassis hinge 54. Thus, the first chassis hinge 54 hingedly connects the hinge plate 58 to the bottom hinge mount 64 and, thereby, to the movable chassis 34. A cover hinge bracket 68 attaches to the cover 24. The second chassis hinge 56 hingedly connects the hinge plate 58 to the cover hinge bracket 68, and, thereby, to the cover 24.

Additionally, a protective shield 70 may be hingedly attached to the movable chassis 34. The protective shield 70 pivots or rotates between a covered position and a raised position. In FIGS. 1, 2, and 3, the protective shield 70 is shown in the raised or opened position, and in FIG. 5, the protective shield 70 is shown in the covered or lowered position. In the raised position, the protective shield 70 allows for access to the splitter module holders 44, the feeder cassettes 46, the distribution cassettes 48 and the connector holder blocks 50. Routing clips 72 may be attached to the inside of the protective shield 70. The routing clips 72 route, organize and maintain the optical fibers routed to and between the splitter module holders 44, the feeder cassettes 46, the distribution cassettes 48 and the connector holder blocks 50. Additionally, when the protective shield 70 is in the raised position, the routing clips 72 automatically move the routed optical fibers away from the splitter module holders 44, the feeder cassettes 46, the distribution cassettes 48 and the connector holder blocks 50. In this way, the routed optical fibers remain accessible but are not in the way if a field technician desires to access one or more of the splitter module holders 44, the feeder cassettes 46, the distribution cassettes 48 and the connector holder blocks 50 for configuring or re-configuring the fiber optic terminal 10. Such configuring or re-configuring may include inserting, removing and/or re-positioning one or more of the splitter module holders 44, the feeder cassettes 46, the distribution cassettes 48 and the connector holder blocks 50. Such configuring or re-configuring may also include routing, connecting or changing the routing or connection of one or more optical fibers. In either such case, the field technician may easily access the optical fibers as may be necessary for such configuring and/or re-configuring.

Figure 5:
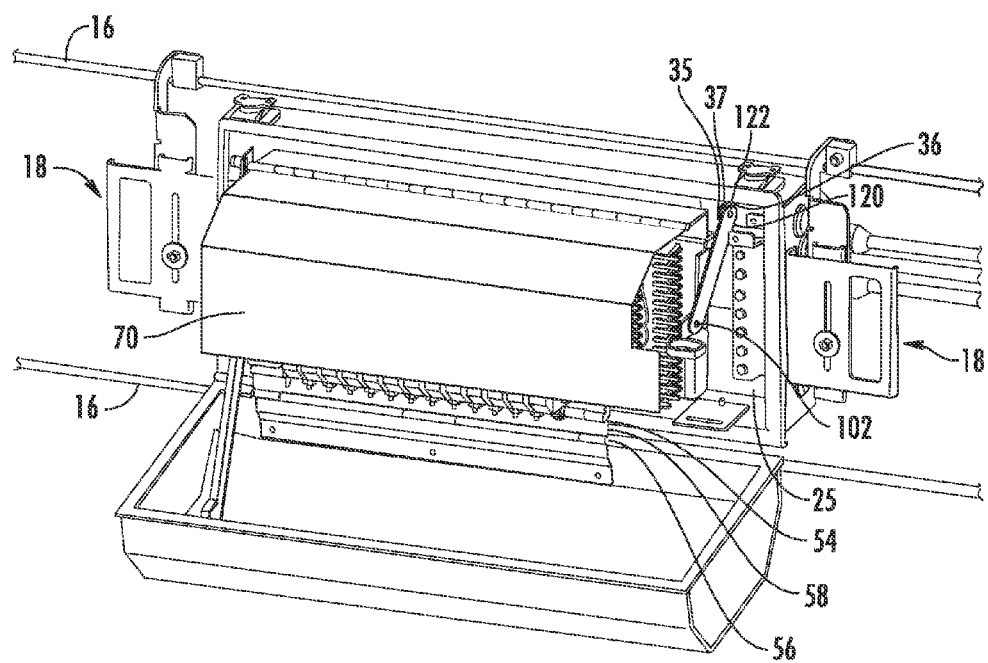
FIG. 5 is a front, perspective view of the open fiber optic terminal of FIG. 1, with a protective shield covering the splice holder modules, feeder cassettes, distribution cassettes, connector holder block mounted in a movable chassis.

In FIG. 5, the protective shield 70 is shown in the covered position. In the covered position the protective shield 70 provides protection against any inadvertent physical contact with the splitter module holders 44, the feeder cassettes 46, the distribution cassettes 48 and the connector holder blocks 50 when the fiber optic terminal 10 is open. Additionally, in the covered position the protective shield 70 secures and protects the optical fibers from, for example, getting pinched or caught between the base 22 and the cover 24, or any other structure or component, especially when the fiber optic terminal 10 is opened or closed. Further, when the fiber optic terminal 10 is closed, the protective shield 70 is in the covered position. In this way, the protective shield 70 provides additional environmental protection to components mounted within the enclosure 20 when the fiber optic terminal 10 is closed.

Referring now to FIG. 2, the movable chassis 34 comprises a first chassis side 74, a second chassis side 76, a chassis top 78, a chassis bottom 80 and a chassis back 82. The movable chassis 34 has an open front 84 opposite the chassis back 82. The chassis bottom 80 in the cassette area 40 is formed with a series of fingers 86 extending from the chassis back 82 to the open front 84. A top hinge mount 88 extends from the chassis top 78 and attaches the chassis top 78 to a shield hinge 90. The shield hinge 90 allows the protective shield 70 to rotate between a covered position and a raised position using a guide bracket 92. The guide bracket 92 is rotatably fixed to the protective shield 70 by a shield pin 94. A first chassis pin 96 attached to the first chassis side 74 inserts into a guide slot 98 cut in the guide bracket 92. In this manner, as the protective shield 70 rotates between the covered position and the raised position on the shield hinge 90, the guide bracket 92 is allowed to move as the protective shield 70 moves. This is due to the guide slot 98 moving along the first chassis pin 96. Any pin described herein, including, without limitation, the shield pin 94 and the first chassis pin 96 may be any type or form of pin or protrusion, including, without limitation, a bare projection or a projection with some type of friction material to control the speed of movement or rotation, and/or a nut, washer and bolt combination that allows for movement and/or rotation.

The use of the double hinged assembly 52 with the connection assembly 30 allows the movable chassis 34 to locate in multiple positions with respect to the base 22 and the cover 24. This The multiple positions include an extended position shown in FIG. 1, FIG. 3 and FIG. 4, a base position, shown in FIG. 6, and a cover position, shown in FIG. 7. As shown in FIG. 6, when the fiber optic terminal 10 is closed, the movable chassis 34 is in the base position. However, as shown in FIG. 3, when the cover 24 is opened, the movable chassis 34 automatically extends out from the base 22 an additional distance. Additionally, as the movable chassis 34 extends out, it tilts upwardly, or away from the cover 24.

The movable chassis 34 is able to position in the extended position through the action of the double hinge assembly 52 and the connection assembly 30. The connection assembly 30 includes a cover connection bracket 100 movably attached to the cover 24, and a first chassis connection bracket 102 movably attached to the enclosure 20 and, also, the movable chassis 34 at the first chassis side 74. The first cover connection bracket 102 may be a double bracket structure that attaches to the cover 24 at cover bracket mount 108 by a cover pin 104 inserted through a hole in the cover bracket mount 108 and holes in a first end 106 of the cover connection bracket 100. This allows the first end 106 of the cover connection bracket 100 to rotate about the cover pin 104. The first chassis connection bracket 102 attaches to the first enclosure bracket 36 by a first spring plunger 110 inserted through a hole in the first end 112 of the first chassis connection bracket 102. This allows the first end 112 of the first chassis connection bracket 102 to rotate about the first spring plunger 110. The first chassis connection bracket 102 also attaches to the movable chassis 34 by a first chassis pin 96 protruding from the movable chassis 34. The first chassis pin 96 inserts through a hole located between the first end 112 and a second end 114 of the first chassis connection bracket 102. The cover connection bracket 100 and the first chassis connection bracket 102 may be connected by a link pin 116 inserted through linkage holes in the second end 118 of the cover connection bracket 100 and the second end 114 of the first chassis connection bracket 102.

With the cover 24 closed, a portion of the movable chassis 34 positions within the base 22. Thus, a portion of the movable chassis 34 toward the open front 84 may extend out a certain distance "x" from the lower edge 26 as shown in FIG. 6. The portion of the movable chassis 34 that extends out may include portions of the chassis top 78, the first chassis side 74, the second chassis side 76, and the chassis bottom 80, along with a portion of any splitter module holders 44, feeder cassettes 46, distribution cassettes 48 positioned within the movable chassis 34. The distance designated as "x" in FIG. 3 and FIG. 6 may be any length. For example "x" may be approximately 3.8 inches. When the cover 24 is opened, the cover connection bracket 100 pulls on the first chassis connection bracket 102 at the link pin 116 causing the first chassis connection bracket 102 to rotate around the first spring plunger 110. The rotation the first chassis connection bracket 102 about the first spring plunger 110 pushes on the first chassis pin 96 forcing the movable chassis 34 to move away from the base 22 and tilt up away the cover 24. This causes the movable chassis 34 to extend out from the enclosure to a distance measured from the back of the enclosure 20 designated as "y" in FIG. 3. The distance "y" may be any length. For example, "y" may be approximately 6.1 inches. The difference between "x" and "y" is designated as "z" in FIG. 3A, and is the additional distance the movable chassis 34 extends from the base 22 when the cover 24 is opened. Using the examples above, that distance may be approximately 2.3 inches calculated by 6.1 inches (y)−3.8 inches (x)=2.3 inches (z). Additionally, the rotation of the first chassis connection bracket 102 about the first spring plunger 110, and the first chassis pin 130 causes the open front 84 of the movable chassis 34 to pivot or tilt away from the cover 24. In FIG. 3, the movable chassis 34 is shown tilted at an angle θ measured from an axis normal to the enclosure back 106. The angle θ may be any degree. For example, the angle θ may be approximately 5.3 degrees.

Also, when the fiber optic terminal 10 is closed the hinge plate 58 may be aligned generally parallel with the chassis bottom 80. As the fiber optic terminal 10 is opened, the hinge plate 58 may rotate around the first chassis hinge 54 and a second chassis hinge 56. The hinge plate 58 may rotate until it is generally perpendicular with the chassis bottom 80 when the cover 24 is fully opened.

Additionally, as depicted in FIG. 4, a second chassis connection bracket 120 attaches to the second enclosure bracket 37 at the second chassis side 76. The second chassis connection bracket 120 attaches to the second enclosure bracket 37 by a second spring plunger 122 inserted through a hole in a first end 124 of the second chassis connection bracket 120. This allows the first end 124 of the second chassis connection bracket 120 to rotate about the second spring plunger 122. The second chassis connection bracket 120 also attaches to the movable chassis 34 by a second chassis pin 126 protruding from the movable chassis 34 through a slot 127 located at a second end 128 of the second chassis connection bracket 120. Additionally, the second chassis connection bracket 120 attaches to a chassis pivot pin 125 located between the first end 124 and the second end 128. As the cover 24 opens, the rotation the second chassis connection bracket 120 about the second spring plunger 122 pushes on the second chassis pin 126 forcing the movable chassis 34

Referring again to FIG. 1 and FIG. 2, the splitter module holders 44 movably position in the splitter area 38 through the open front 84 on rail guides 132 mounted as opposing pairs on the chassis top 78 and the chassis bottom 80. In this way, the splitter module holders 44 may be inserted into the movable chassis 34, removed from the movable chassis 34 or repositioned in the movable chassis 34. Similarly, the feeder cassettes 46 and the distribution cassettes 48 movably position in the cassette area 40 on the rail guides 132 mounted on the chassis top 78 and the chassis bottom 80. The rail guides 132 mounted on the chassis bottom 80 in the cassette area 40 each mount on one of the fingers 86. The feeder cassettes and the distribution cassettes may position in the movable chassis 34 in an adjacent alignment. To provide for optical fiber routing efficiency, the feeder cassettes 46 may position adjacent to one another and the distribution cassettes 48 may position adjacent to one another. Because the feeder cassettes 46 and the distribution cassettes 48 movably position on the rail guides 132 in the movable chassis 34, one or more of the feeder cassettes 46 and one or more of the distribution cassettes 48 may be inserted into the movable chassis 34, removed from the movable chassis 34 or repositioned in the movable chassis 34. Thus, each of the splitter module holders 44, the feeder cassettes 46 and distribution cassettes 48 may be separately and independently inserted, removed and repositioned in the movable chassis 34 making the fiber optic terminal 10 modular and variably configurable.

When the movable chassis 34 positions in the extended position, the splitter module holders 44, feeder cassettes 46, distribution cassettes 48, and the connector holder blocks 50 become more accessible to the field technician for initial configuration of the fiber optic terminal 10 at or after installation, and/or for subsequent reconfiguration of the fiber optic terminal 10. Such configuration and/or reconfiguration may include the addition or removal of one or more splitter module holders 44, feeder cassettes 46 or distribution cassettes 48, as described above. Additionally, such configuration or reconfiguration may include the routing of an optical fiber 148, 150 from a feeder cable 12 or distribution cable 14 to different components mounted in the interior space 25 of the fiber optic terminal 10. For example, such routing may include moving a splitter leg from the connector holder in the parking area 42 to the distribution cassette 48, or vice-versa, and other configuration changes, to provide or discontinue service to a subscriber.

Figure 7:
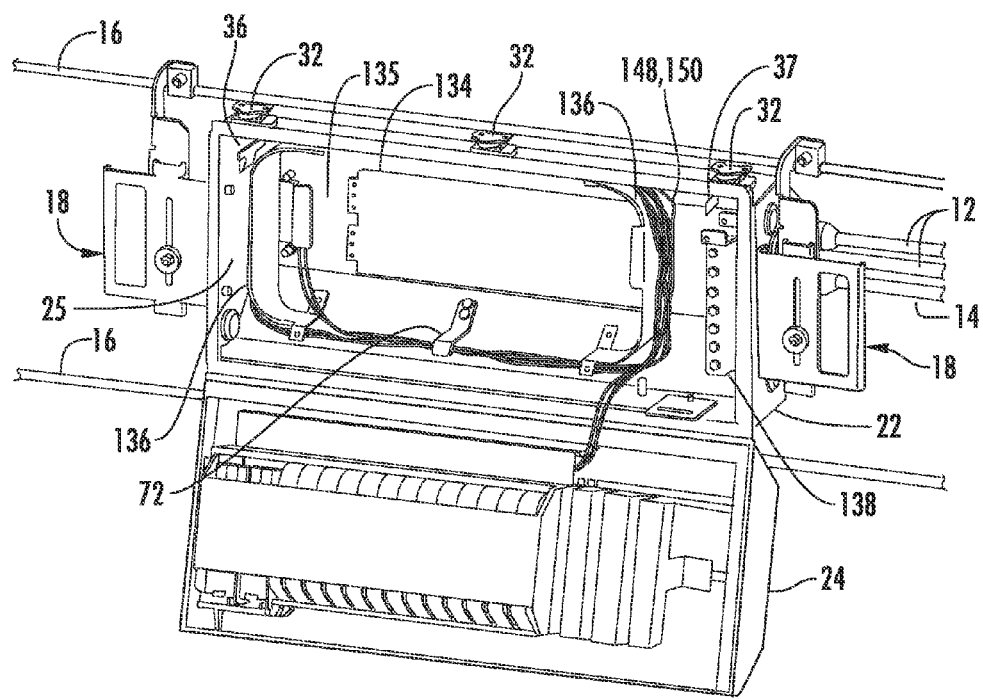
FIG. 7 is a front, perspective view of the fiber optic terminal of FIG. 1 illustrating the movable chassis in a cover position and components mounted in the base.

Referring now to FIG. 7, the movable chassis 34 is shown positioned in the cover position when the fiber optic terminal 10 is open. To position the movable chassis 34 into the cover position, the first spring plunger 110 and the second spring plunger 122 are pulled out such that the first chassis connection bracket 102 disconnects from the first enclosure bracket 36 and the second chassis connection bracket 120 disconnects from the second enclosure bracket 37. Thus, pulling on the first spring plunger 110 and the second spring plunger 122, detaches the movable chassis 34 from the base 22. Because the movable chassis 34 is detached from the base 22, the movable chassis 34 may then be rotated about the double hinge assembly 52 from the extended position into the cover position. Positioning the movable chassis 34 in the cover position allows access to the inside of the base 22 and the components mounted therein. As the movable chassis 34 rotates to position in the cover 24, the hinge plate 58 may rotate around the first chassis hinge 54 and a second chassis hinge 56. The hinge plate 58 may rotate until it is generally parallel with the chassis bottom 80 when the movable chassis 34 is in the cover position.

As shown in FIG. 7, one or more enclosure splice trays 134 may mount in the interior space 25 in the base 22 in a fiber management area 135. Additionally, the fiber management area 135 may include components that provide for the management of the optical fibers 148, 150 from the feeder cable 12 and the distribution cable 14, respectively. To facilitate optical fiber management, two routing guides 136 may extend from the interior space 25 in the base 22. In addition, one or more routing clips 72 mount in the base 22. Another component mounted in the base, may be a grounding assembly 138, which is shown attached to a side of the base 22. The feeder cable 12 and the distribution cable 14 enter the fiber optic terminal 10 through entry ports 140 in the enclosure 20. In FIG. 6, the entry ports 140 are shown located in a first wall 142 and a second wall 144 of the base 22, but the ports 140 may be located at any position on the enclosure 20.

Figure 22:
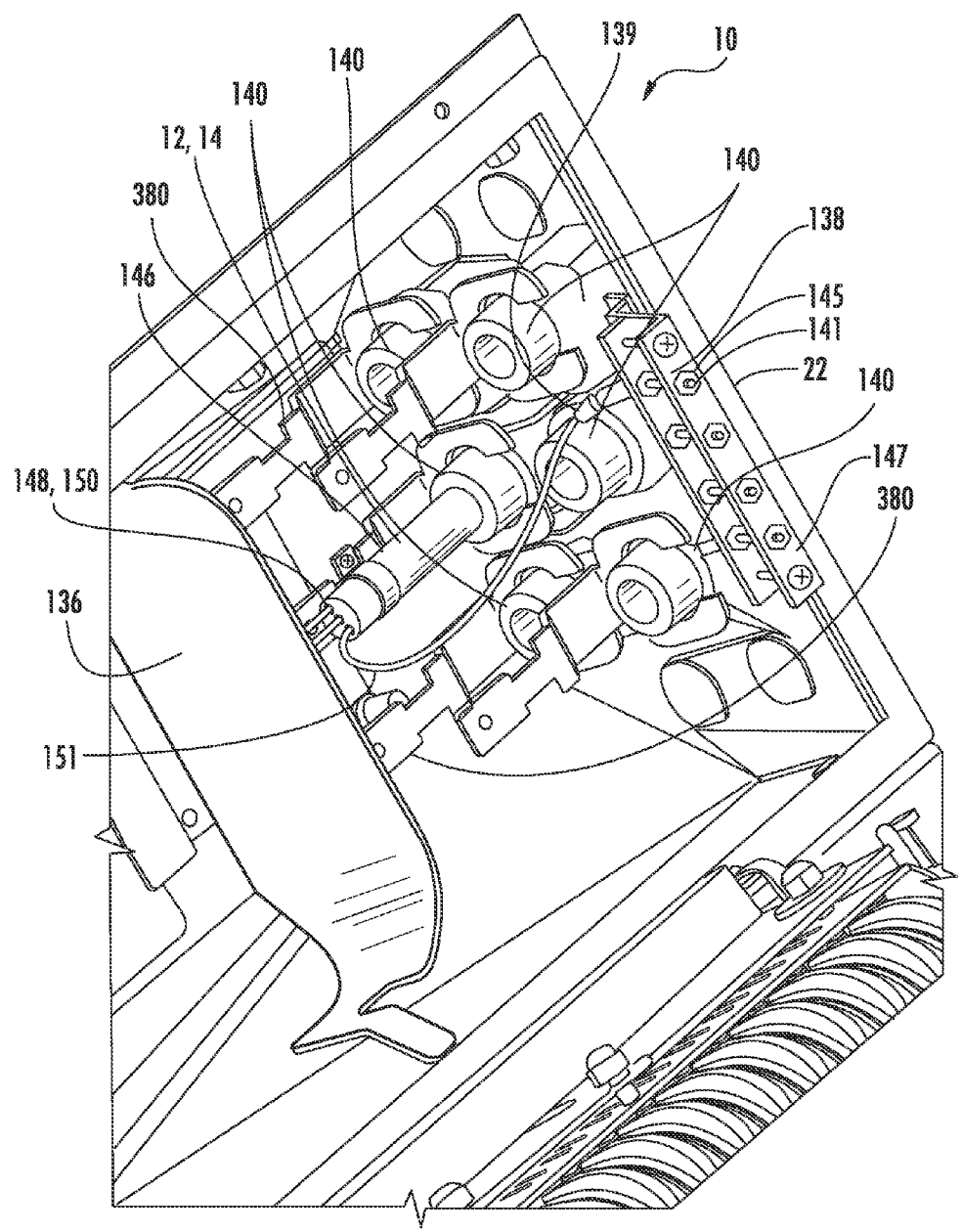
FIG. 22 is a partial, detail, perspective view of the base illustrating ports and strain relief devices and a grounding assembly in the fiber optic terminal.
Figure 23A:
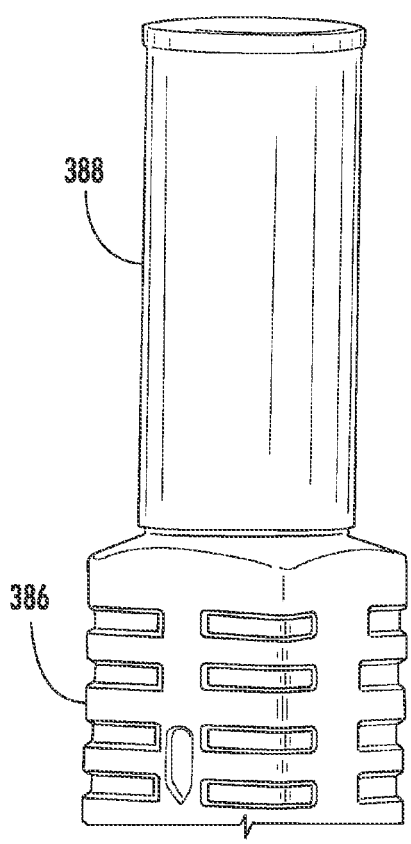
FIGS. 23A and 23B are front, elevation views of the fiber optic terminal of FIG. 1 mounted on a pedestal with a pedestal cover installed and with the pedestal cover removed and illustrating a pedestal mounting bracket.
Figure 23B:
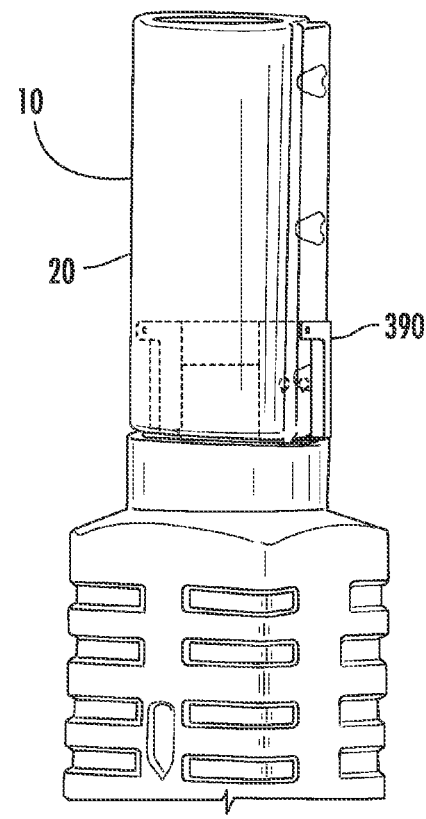

The entry ports 140 may be a pass-through type port, with a standard hub and/or grommet function. Alternatively, one or more of the entry ports 140 may have a fiber optic adapter seated therein. The fiber optic adapter may be configured to receive a single optical fiber connector or multiple optical fiber connectors, including, without limitation, as examples SC, LC, MTP, OptiTap® or OptiTip™ adapters commercialized by Corning Cable Systems LLC, Hickory, N.C. Once inside the enclosure 20, the jacket 146 on the feeder cable 12 and the distribution cable 14 is removed to allow the optical fibers 148, 150 to separately route inside the enclosure. Strain relief devices as shown in FIG. 22 may also be provided. FIG. 6 illustrates the routing of the optical fibers 148, 150 in the base. The optical fibers 148, 150 route around the cable guides 136 and through the cable clips 72. In this manner, the routing guides 132 and the routing clips 72 manage the routing of the optical fibers 148, 150 and accommodate any slack to provide an organized installation. This allows the field technician to effectively and easily accommodate varying lengths of the optical fibers 148, 150 and identify the particular optical fibers 148, 150. One or more of the optical fibers 148 of one section of the feeder cable 12 may route to the enclosure splice tray 134 where they are spliced to one or more of the optical fibers 148 of another section of the feeder distribution cable 12. In this way, multiple fiber optic terminals 10 may be concatenated or series connected.

Figure 8:
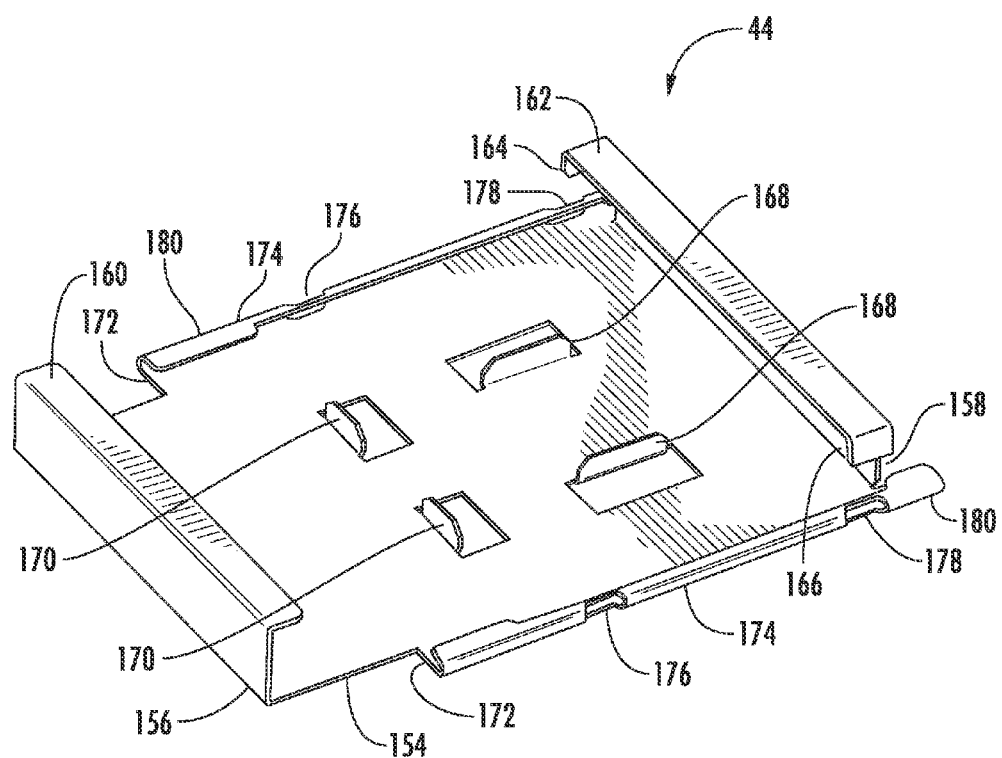
FIG. 8 is a top, perspective view of a splitter module holder without splitter modules mounted therein.
Figure 9:
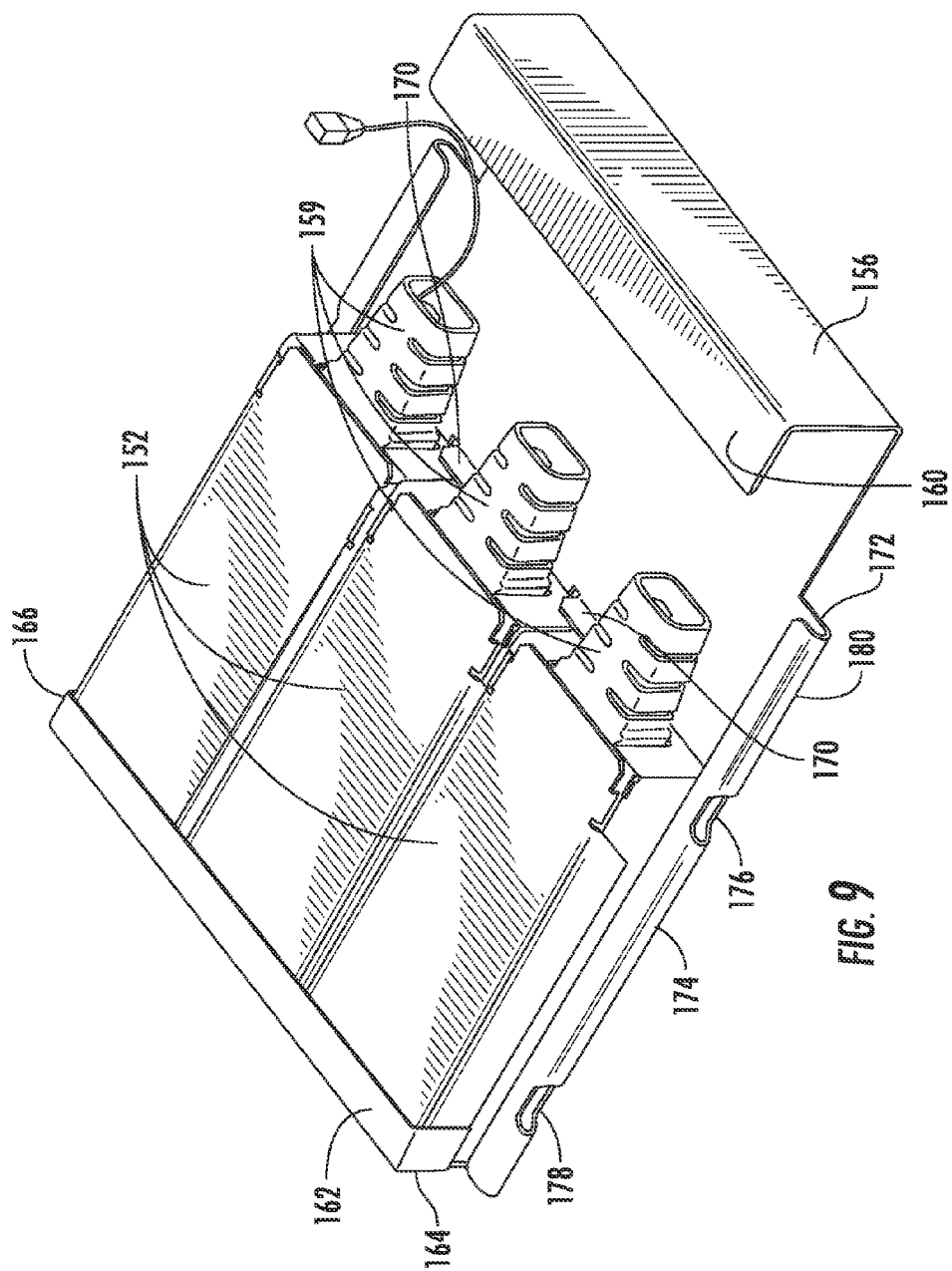
FIG. 9 is a top, perspective view of the splitter module holder of FIG. 7 including splitter modules mounted therein.

Referring now to FIGS. 8 and 9, the structure of the splitter module holder 44 and the mounting of the splitter modules 152 will be discussed. The splitter module holder 44 without splitter modules 152 mounted therein is illustrated in the FIG. 8 and the splitter module holder 44 with splitter modules 152 is illustrated in FIG. 9. The splitter module holder 44 comprises a splitter platform 154 with a front side 156 and a back side 158 extending generally perpendicular therefrom. A front edge 160 bends or extends back towards the back side 158. Forming the front side 156 in this manner facilitates several functions. Such functions may include inserting the splitter module holder 44 into the splitter area 38 in the movable chassis 34, removing the splitter module holder 44 from the splitter module holder area 40 in the movable chassis 34, and carrying the splitter module holder 44 when removed from the movable chassis 34. Additionally, by forming the front side in this manner, the front side 156 may protect, organize and route the optical fiber input into the splitter module 152 and the splitter legs output from the splitter module 152.

A back edge 162 bends or extends towards the front side 156. A first end 164 and a second end 166 of the back edge 162 curve downwardly. In this way, the back of the splitter module 152 may fit under the back edge 162 and within the first end 164 and the second end 166 of the back side 158. The back of the splitter module 152 may be for example, but without limitation, the end without a boot 159. Side positioning tabs 168 and front positioning tabs 170 extend from the splitter platform 154. The side positioning tabs 168 align the splitter modules 152 in a side-to-side configuration while the front positioning tabs 170 align the splitter modules 152 in a front-to-back configuration. This can be seen with reference to FIG. 8, which illustrates three splitter modules 152 mounted in the splitter module holder 44 in a three across alignment. The side positioning tabs 168 (hidden in FIG. 8) align the splitter modules 152 in the three across alignment, and the front positioning tabs 170 align the back of the splitter modules 152 against the back side 158 and under the back edge 162 between the first end 164 and the second end 166.

The splitter platform 154 has two sides 172 that extend out from the splitter platform 154 and curve back in to form holder rails 174. Each holder rail 174 has a first holder detent 176 and second holder detent 178 extending through a curved portion 180 thereof. In this manner, when inserting the splitter module holder 44 into or removing the splitter module holder 44 from the movable chassis 34, one of the holder rails 174 may engage with and slide in the rail guide 132 mounted in the chassis top 78 in the splitter holder area 38, and the other of the holder rails 174 may engage with and slide in the rail guide 132 mounted in the chassis bottom 80 in the splitter holder area 38. Both holder rails 174 are designed such that either may engage with and slide in the rail guides 132 in the chassis top 78 or the chassis bottom 80. In either case, the splitter module holder 44 may be inserted in the splitter area 38 with the back side 158 first so that the front side 156 may be accessible from the open front 84 of the movable chassis 34 to provide access to the optical fiber input into the splitter module 152 and the splitter legs output from the splitter module 152. As the splitter module holder 44 inserts into the movable chassis 34, the first holder detent 176 and the second holder detent 178 engage protrusions formed in the rail guide 132 as will be discussed in more detail herein with respect to FIGS. 18A and 18B.

Figure 10:
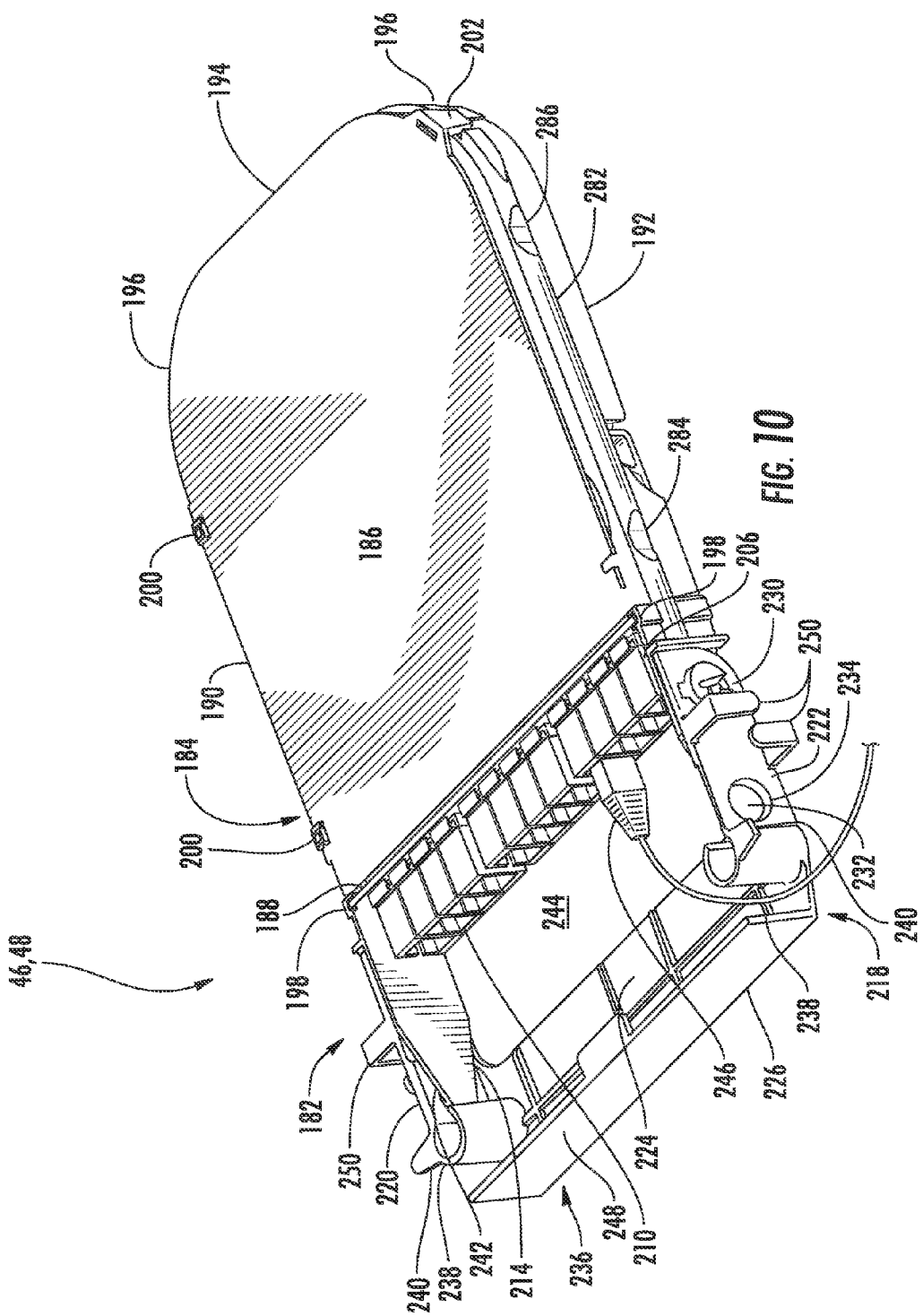
FIG. 10 is a top, perspective view of a cassette with a front section and a rear section and cassette cover closed over the rear section, and a frame assembly in a first position at the front section.

The feeder cassette 46 and the distribution cassette 48 are illustrated in FIGS. 10-17. Since the feeder cassette 46 and the distribution cassette 48 have the same structure, and, therefore, may be interchangeable, when referring to the structure the term "cassette" will be used with both component numbers 46, 48. It should be understood that cassette refers to either or both of the feeder cassette 46 and the distribution cassette 48. However, the terms "feeder cassette" and the "distribution cassette" will be used when necessary in the discussion to distinguish between the two, for example when discussing different components mounted in each. The interchangeability of the cassettes allows for economy in stocking parts Referring now to FIG. 10, the cassette 46, 48 is illustrated having a front section 182 and a rear section 184. The rear section 184 has a cassette cover 186, a cassette front wall 188, a first cassette side 190, a second cassette side 192, opposite the first cassette side 190, and a cassette back wall 194. In FIG. 10, the cassette cover 186 is shown in the closed position over the rear section 184 of the cassette 46, 48. The first cassette side 190 and the second cassette side 192 extend from the front section 182 to the cassette back wall 194, and connect with the cassette back wall 194 in a curvilinear structure 196 without forming corners thereat. The cassette front wall 188 attaches to the first cassette side 190 and the second cassette side 192 in side slots 198 formed in the first cassette side 190 and the second cassette side 192. The cassette cover 186 positions on the rear section 184 and may have one or more hinge points 200 at the cassette front wall 188, first cassette side 190, the second cassette side 192 or the cassette back wall 194 to allow the cassette cover 186 to move between an open and a closed position. In the embodiment shown in FIG. 10, the hinge points 200 are positioned on the first cassette side 190. When the cassette cover 186 is closed, cover tabs 202 friction fit into tab notches 204 to releasably retain the cassette cover 186 in the closed position. Alternatively the cassette cover 186 may not be hinged but may be designed to lift completely off of the rear section 184. In such event, cover tabs 202 may also be provided on one or more of the cassette front wall 188, the first cassette side 190 and the second cassette 192 side to attach the cassette cover 186 to the rear section 184 by friction fitting the cover tabs 202 into the tab notches 204. Also, alternatively, the cassette cover 186 may be slidably attached to the rear section 184.

Figure 11:
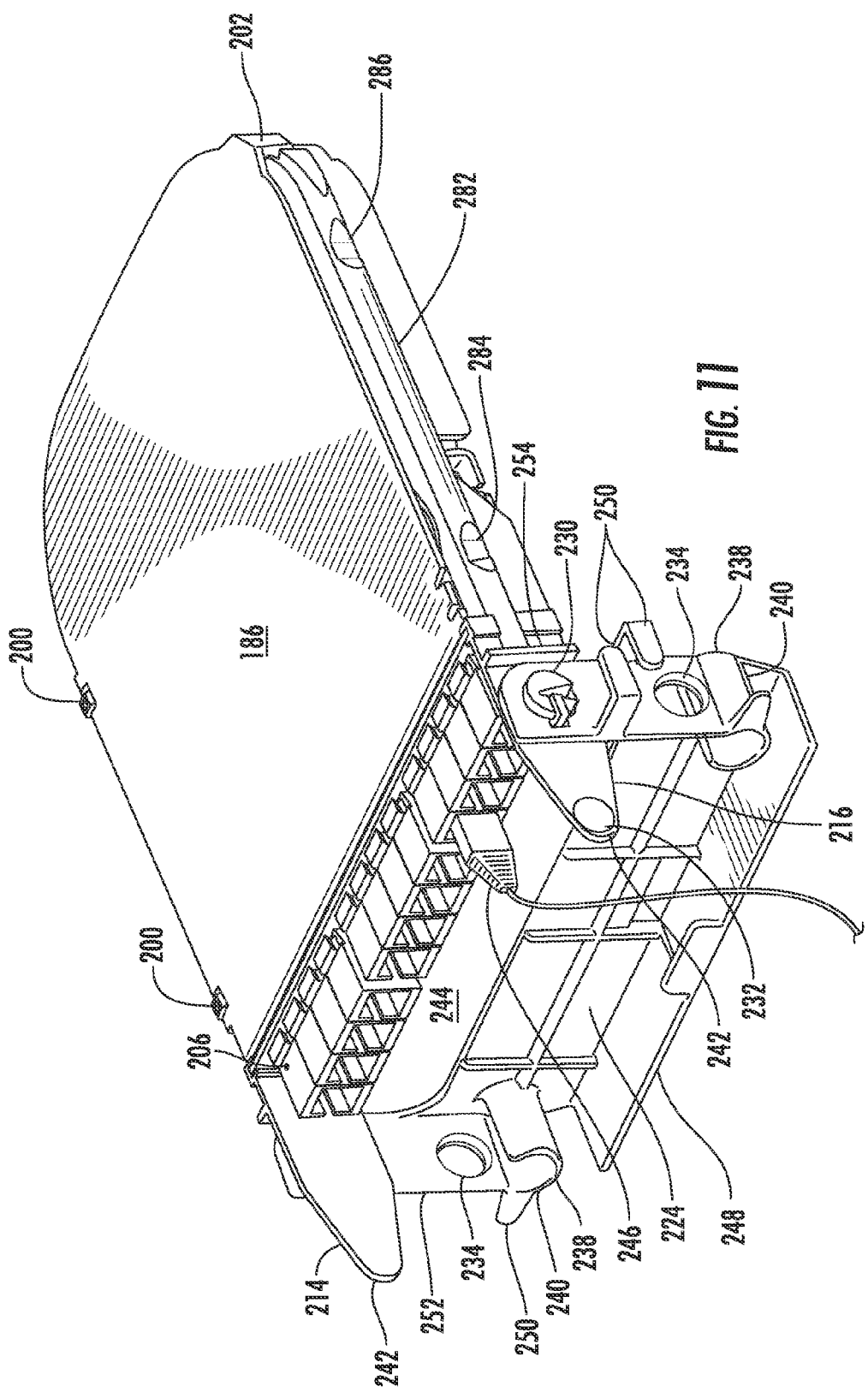
FIG. 11 is a top, perspective view of the cassette of FIG. 10 with the frame assembly rotated to a second position.

Fiber optic adapters 206 extend through apertures (hidden in FIG. 10) in the cassette front wall 188. In this manner, a first end 210 of the fiber optic adapters 206 positions in and opens into the front section 182 and a second end 212 of the fiber optic adapters 206 positions in and opens into the rear section 184 as shown in FIG. 11. The fiber optic adapters may be any type of adapter that accepts an optical fiber connector. For example, without limitation, such fiber optic adapters may be SC, LC, simplex and/or duplex fiber optic adapters. Additionally, although the cassette in FIGS. 10-17 are shown with 12 fiber optic adapters, any number of fiber optic adapters may be used. A first cassette side extension 214 and a second cassette side extension 216 extend into the front section 182.

The front section 182 comprises a frame assembly 218 having a first frame side 220, a second frame side 222, a plate 224, and a frame front 226. The first frame side 220 pivotally attaches to the first cassette side extension 214 at a first pivot pin 228 (hidden in FIG. 10). The second frame side 222 pivotally attaches to the second cassette side extension 216 at a second pivot pin 230. Bumps 232 are formed on an outside of the first cassette side extension 214 and the second cassette side extension 216. The bumps 232 engage respective retaining holes 234 in the first frame side 220 and the second frame side 222, respectively. When engaged in the retaining holes 234, the bumps 232 releasably retain the first frame side 220 and the second frame side 222 in a first frame position as illustrated in FIG. 10.

An open cylindrical cable guide 238 is formed at distal ends 240 of the first frame side 220 and second frame side 222. The first cassette side extension 214 and the second cassette side extension 216 each have a tapered end 242. When the frame assembly 218 is in the first frame position, the tapered end 242 of the first cassette side extension 214 locates in the open cylindrical cable guide 238 at the distal end 240 of the first frame side 220. The tapered end 242 of the second cassette side extension 216 locates in the open cylindrical cable guide 238 at the distal end 240 of the of the second frame side 222 when the frame assembly is in the first frame position.

The plate 224 extends between the distal ends 240 of the first frame side 220 and the second frame side 222 and provides support for optical fibers routed to the cassette 46, 48. The plate 224 is separated from the cassette front wall 188 by an access area 244, such that the access area 244 is adjacent to the first end 210 of the fiber optic adapters 206. The plate 224 may have stiffeners 236 formed therein to provide additional strength and stiffness. By being located adjacent to the first end 210 of the fiber optic adapters 206, the access area 244 provides finger access to the fiber optic adapters 206 to facilitate the insertion and removal of fiber connectors 246 at the ends of optical fibers. The frame front 226 extends generally perpendicularly from a front edge 248 of the plate 224 and acts to retain the optical fibers routed to the cassette 46, 48 on or at the plate 224. Additionally, frame cable guides 250 are provided to maintain, organize and route the optical fibers.

Referring now to FIG. 11, the frame assembly 218 is shown in the second frame position. Manual pressure applied to the frame front 226 releases the bumps 232 from the retaining holes 234 and allows the frame assembly 218 to pivot through an angle of up to about 90 degrees. Stops 254 extending from the first cassette side extension 214 and the second cassette side extension 216 restrict the frame assembly 218 from pivoting further. By pivoting the frame assembly 218 to the second frame position, greater access may be provided to the first ends 210 of the fiber optic adapters 206 for initially installing, configuring and/or re-configuring the optical fibers to the cassette.

Figure 12:
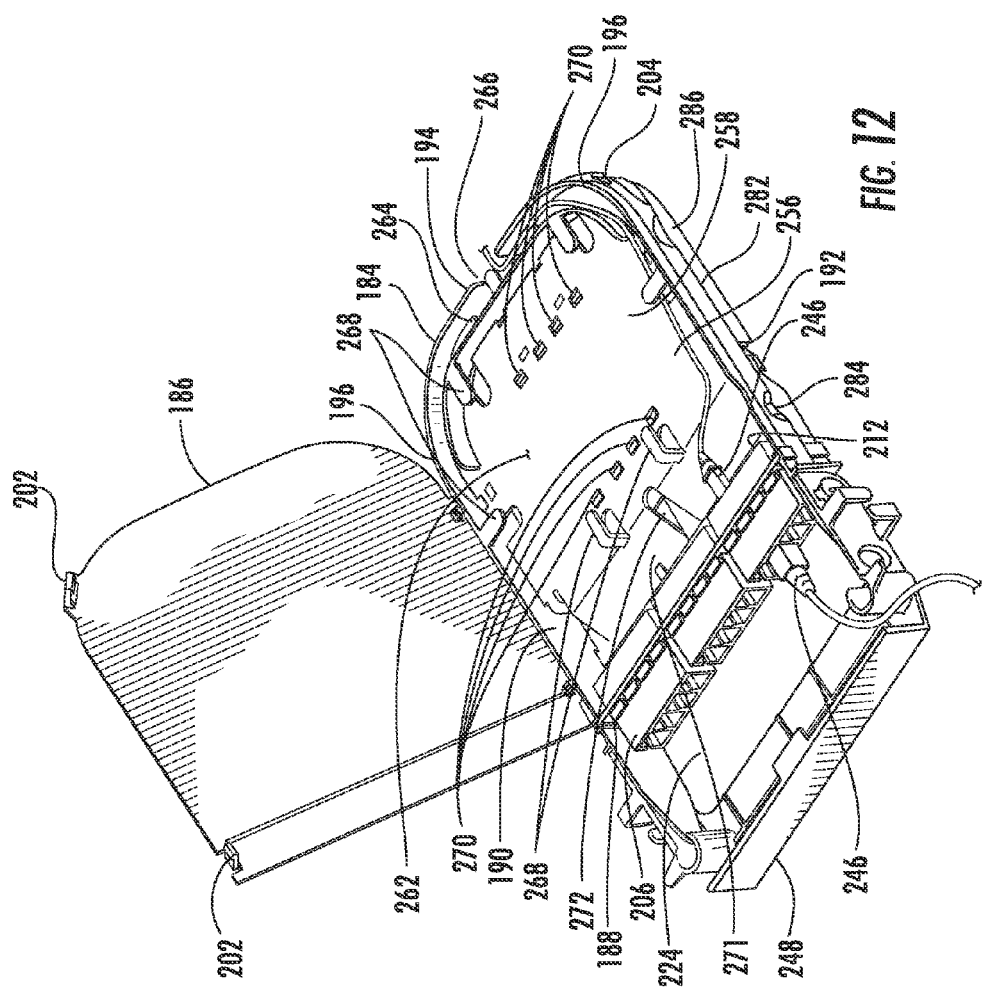
FIG. 12 is a top, perspective view of the cassette of FIG. 10 with the cassette cover open showing a mounting area at a first mounting side of a mounting base in the rear section.

Referring now to FIG. 12, the cassette is shown with the cassette cover 186 open exposing the inside of the rear section 184. A generally flat planar mounting base 256 having a first mounting side 258 and a second mounting side 260 (see FIGS. 16 and 17) extends between and is bounded by the cassette front wall 188, the cassette back wall 194, the first cassette side 190, and the second cassette side 192. In this manner, a mounting area 262 may be defined for mounting optical components and for routing optical fibers to the optical components. A cassette routing guide 264 extends generally perpendicularly from the first mounting side 258 and runs along a line parallel to the cassette back wall 194 and the curvilinear structure 196 where cassette back wall 194 connects to the first cassette side 190 and the second cassette side 192. The cassette routing guide 264 is configured to route, organize and maintain the optical fibers in the mounting area 262, including any optical fibers that may enter the mounting area 262 through an access port 266 in the cassette back wall 194. Additionally, cassette routing tabs 268 extend from the cassette routing guide 264 and the first mounting side 258 to facilitate the routing of the optical fibers.

Component mounting holes 270 may extend between the first mounting side 258 and the second mounting side 260. The component mounting holes 270 may be used for interchangeably mounting optical components attached to mounting inserts with tabs that mate with and friction fit into one or more of the component mounting holes 270. In this manner, different optical components may be removably mounted in the mounting area 262 such that the cassette 46, 48 may be initially configured and subsequently re-configured as necessary for certain applications. As examples, one of the distribution cassettes 48 may have a splice tray mounted in the mounting area 262, while one of the feeder cassettes 46 may have a coarse wave division multiplexer (CWDM) mounted in mounting area 262. Subsequently, the feeder cassette 46 may be re-configured by removing the CWDM and mounting a splice tray in the mounting area 262. Further, the distribution cassette 48 may be subsequently re-configured by removing the splice tray and mounting a multi-fiber connector in the mounting area 262. Thus the component mounting holes 270 allow for variably configuring the cassettes 46, 48 to address the specific requirements of the optical network. Alternatively or additionally, other ways for mounting optical components in the mounting area 262 may be used, as examples, without limitation, fastener, adhesives and Velcro® fastener, and a combination of one or more thereof.

Figure 13:
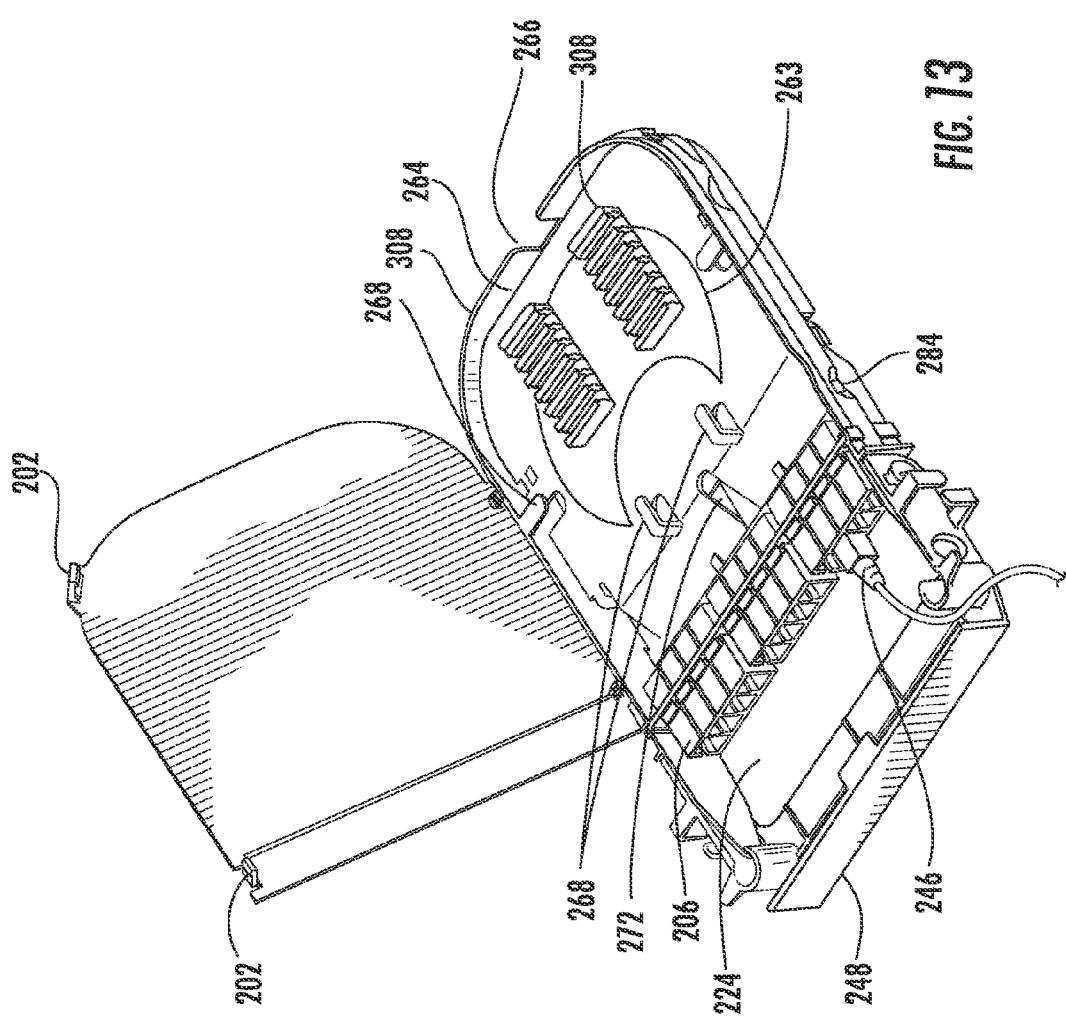
FIG. 13 is a top, perspective view of the cassette of FIG. 10 with the cassette cover open showing a splice holder mounted in the mounting area at a first mounting side.
Figure 14:
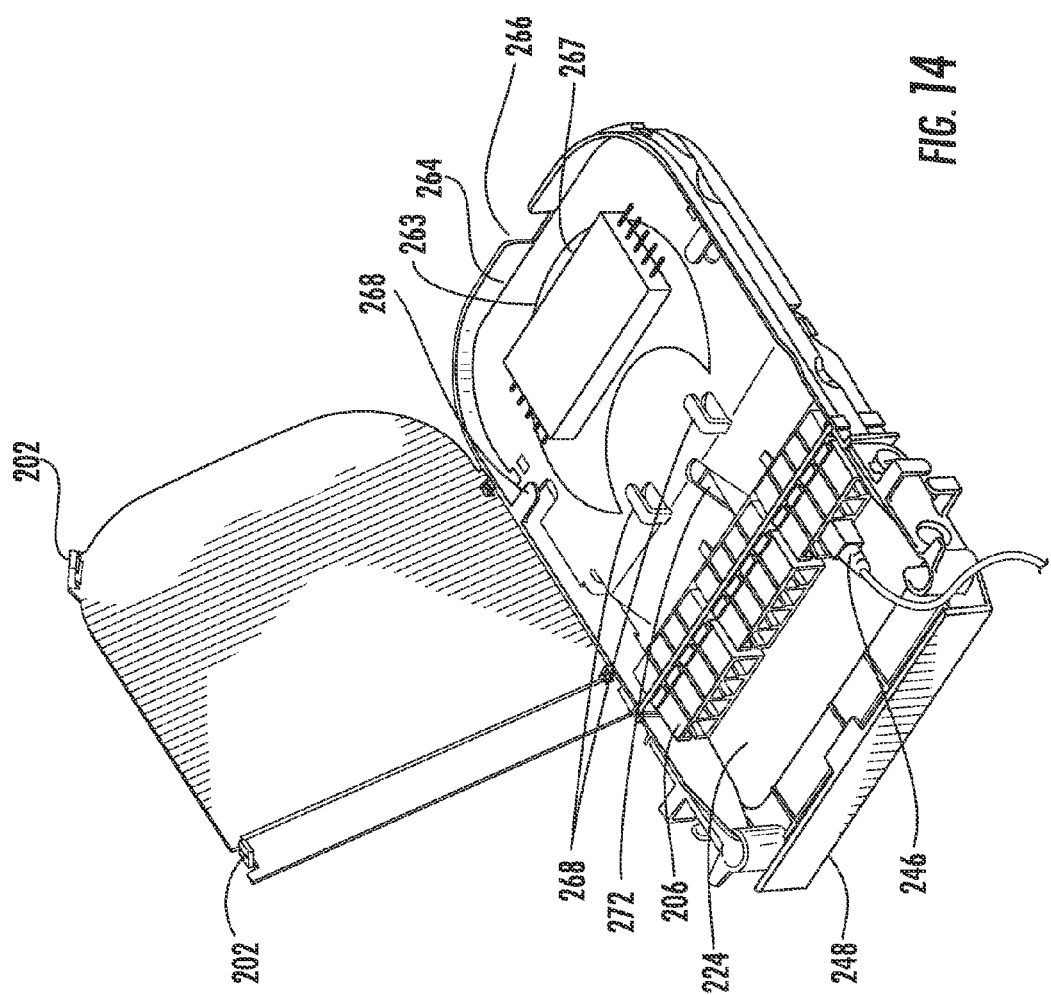
FIG. 14 is a top, perspective view of the cassette of FIG. 10 with the cassette cover open showing a CWDM module mounted in the mounting area at a first mounting side.
Figure 15:
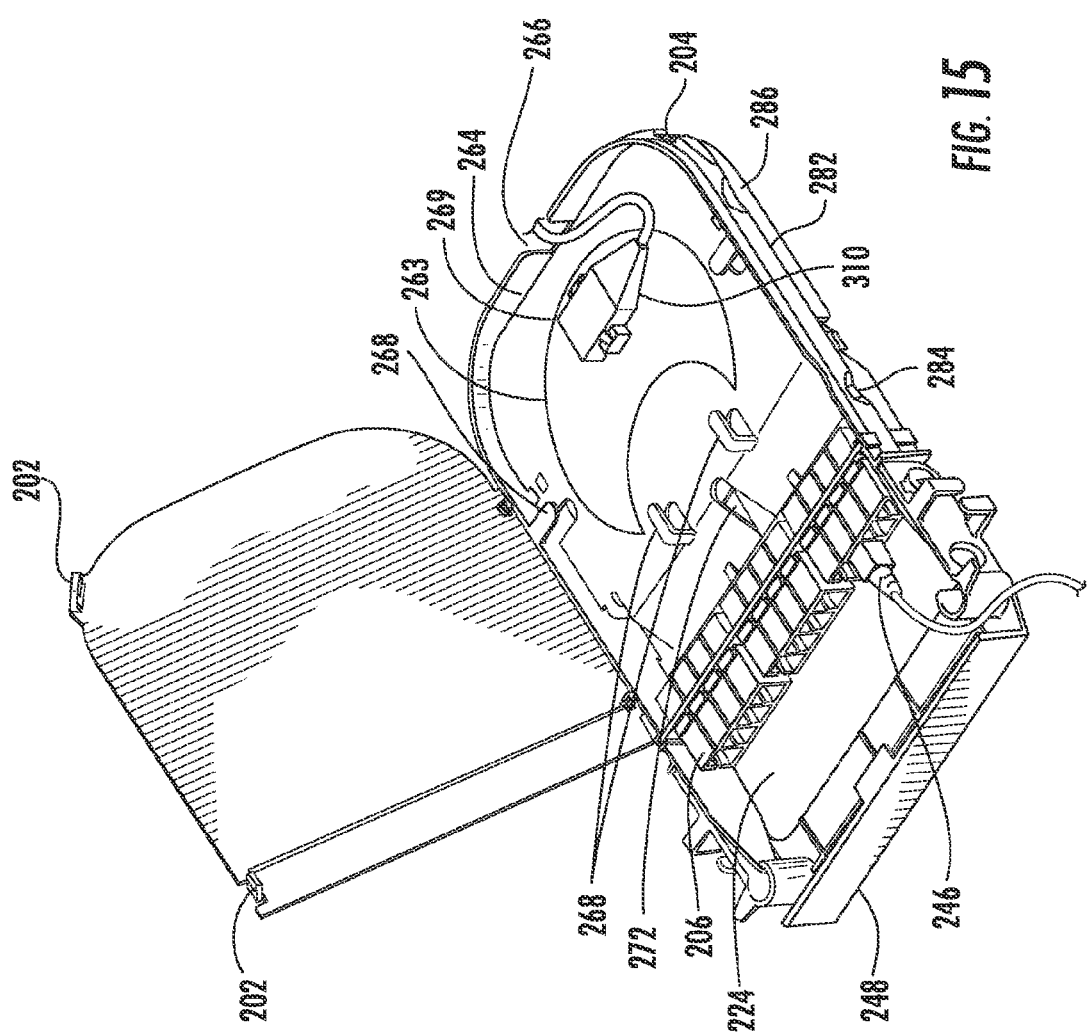
FIG. 15 is a top, perspective view of the cassette of FIG. 10 with the cassette cover open showing a multi-fiber adapter and connector mounted in the mounting area at a first mounting side.

FIGS. 13, 14 and 15 illustrate three exemplary embodiments of cassettes 46, 48 with an insert 263 having a fiber optic component positioned therein using the mounting holes. FIG. 13 shows an insert 263 with a splice holder 308 positioned in the cassette 46, 48. FIG. 14 shows an insert with a CWDM module 267 positioned in the cassette 46, 48. And FIG. 15 shows an insert 263 with a multi-fiber adapter 269, with a multi-fiber connector 308 positioned in the cassette 46, 48. In the embodiment illustrated in FIG. 15, another multi-fiber connector 308 may be inserted in the other end of the multi-fiber adapter 269. A multi-fiber cable, such as, for example a ribbon cable, may extend from the multi-fiber connector 308. The optical fibers in the multi-fiber cable may furcate out and extend to and connect in the second end 212 of fiber optic adapters 206. Alternatively or additionally, the multi-fiber connector 308 may not connect to a multi-fiber adapter 269 in the cassette 46, 48. Instead, enough multi-fiber cable may be provided to allow the multi-fiber connector 308 to extend from the cassette 46, 48 to the enclosure 20 wall and there connect to a multi-fiber adapter 269 mounted in an entry port 140. In other words, a portion of the multi-fiber cable slack stored in the cassette 46, 48, may be unwound and removed from the cassette 46, 48. However, the optical fibers in the multi-fiber cable may still connect with the second end 212 of fiber optic adapters 206. In this way, an optical connection may be established between the multi-fiber adapter 269 mounted in an entry port 140 and the second end 212 of fiber optic adapters 206. It should be understood that FIGS. 13, 14 and 15 are provided to illustrate the modular and configurable characteristics of the cassette 46, 48, and are not in any manner intended to be limiting in the quantity and/or type of components that may be positioned in the cassette 46, 48. Additionally, although fiber optic components are shown in FIGS. 13, 14 and 15, electronic components may also be positioned in the cassette 46, 48.

Continuing with reference to FIG. 12, the first mounting side 258 has a slope 271 that slopes toward the second mounting side 260 at a location adjacent to the cassette front wall 188. This provides sufficient space for the optical fibers in the mounting area 262 to connect to the second end 212 of the fiber optic adapters 206. An access opening 272 may extend through the mounting base 256 from the first mounting side 258 to the second mounting side 260. The access opening 272 may be used to route optical fibers between the first mounting side 258 and the second mounting side 260.

Figure 16:
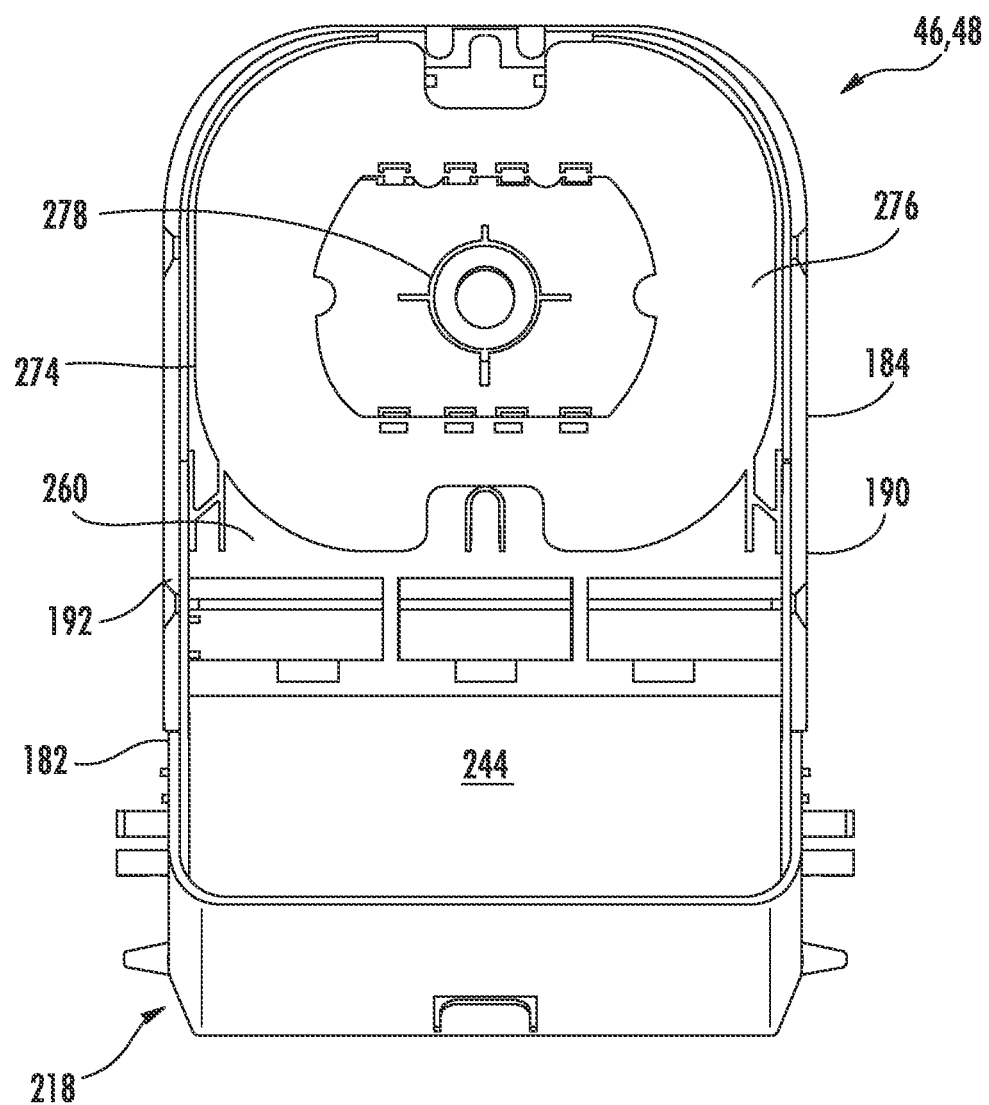
FIG. 16 is a bottom, plan view of the cassette of FIG. 10 showing a buffer tube slack storage mounted on the second side of the mounting base in the rear section.
Figure 17:
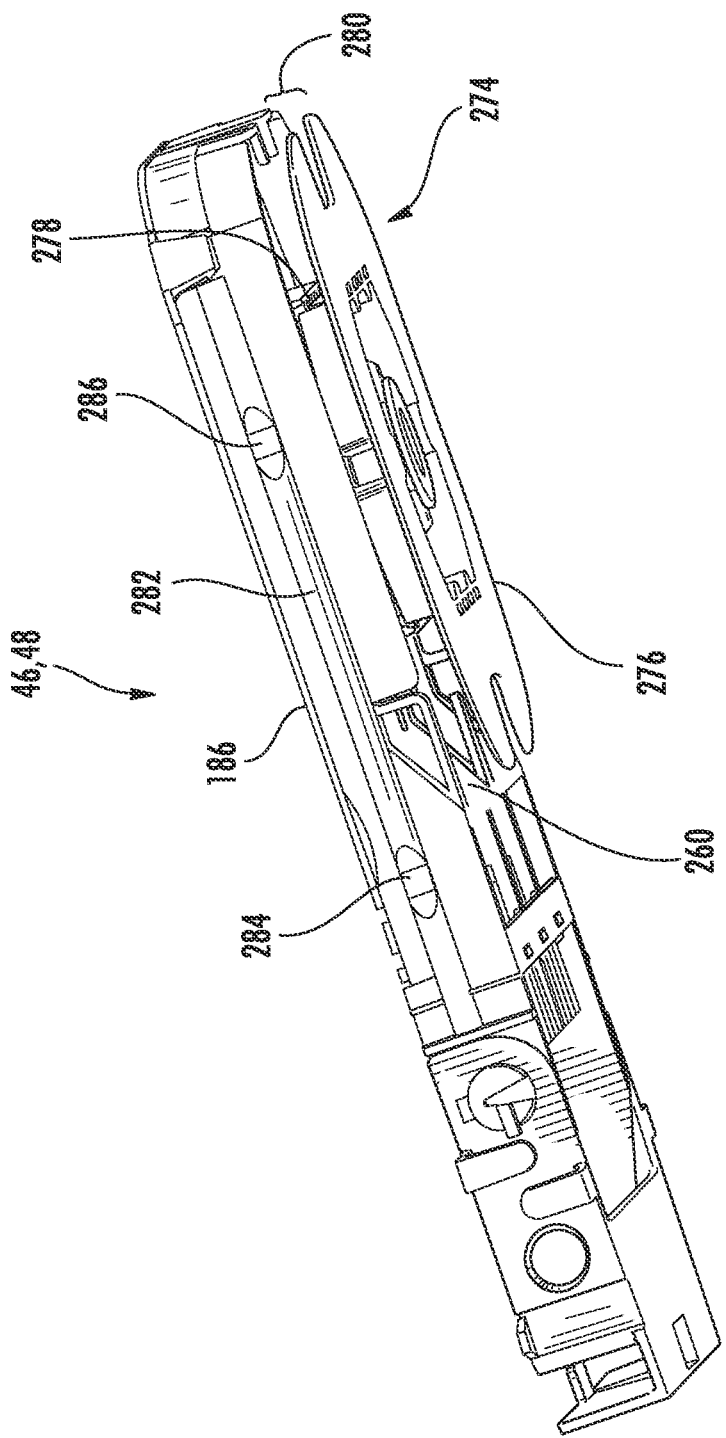
FIG. 17 is a bottom, perspective view of the cassette of FIG. 10 showing the buffer tube slack storage of FIG. 13.

Referring to FIGS. 16 and 17, the second mounting side 260 is depicted. In the embodiment illustrated in FIGS. 16 and 17, a buffer tube slack storage 274 is mounted to the second mounting side 260. The buffer tube slack storage 274 removably mounts to the second mounting side 260 using the component mounting holes 270, as discussed above with respect to the first mounting side 258. The buffer tube slack storage 274 may be used to store and organize any slack in the optical fibers that enter the cassette 46, 48. When mounted to the second mounting side 260, the buffer tube slack storage 274 may be positioned to facilitate the placement of optical fiber buffer tube slack on buffer tube slack storage 274. This may be done by pulling on the retainer plate 276 which is attached to a telescoping hub 278. As the telescoping hub 278 extends, a gap 280 forms between the retainer plate 276 and the rest of the cassette 46, 48 as illustrated in FIG. 17. The gap 280 allows for placement of optical fiber buffer tube slack on the buffer tube slack storage 274. Once the optical fiber buffer tube slack is placed on the buffer tube slack storage 274, the telescoping hub 278 may be retracted by pushing on the retainer plate 276 closing or at least partially closing the gap 280.

Continuing to refer to FIGS. 10-17, cassette rails 282 extend from the first cassette side 190 and the second cassette side 192. The cassette rails 282 have a first cassette detent 284 and second cassette detent 286. In this manner, when inserting or removing the cassette 46, 48 from the movable chassis 34, the cassette rails 282 may engage with and slide in the rail guides 132 mounted in the chassis top 78 the chassis bottom 80 in the cassette area 40. Both cassette rails 174 are designed such that either may slide in the rail guides 132 in the chassis top 78 or the chassis bottom 80. In either case, the cassette 46, 48 may be inserted in the cassette area 44 with the rear section 184 first so that the front section 182 extends out of the open front 84 of the movable chassis 34 to provide access to the optical fiber input into the cassette 46, 48. Each cassette rail 282 has a first cassette detent 284 and second cassette detent 286. As the cassette 46, 48 inserts into the movable chassis 34, the first cassette detent 284 and the second cassette detent 286 engage protrusions formed in the rail guide 132 as will be discussed in more detail herein with respect to FIGS. 18A and 18B.

Figure 18A:
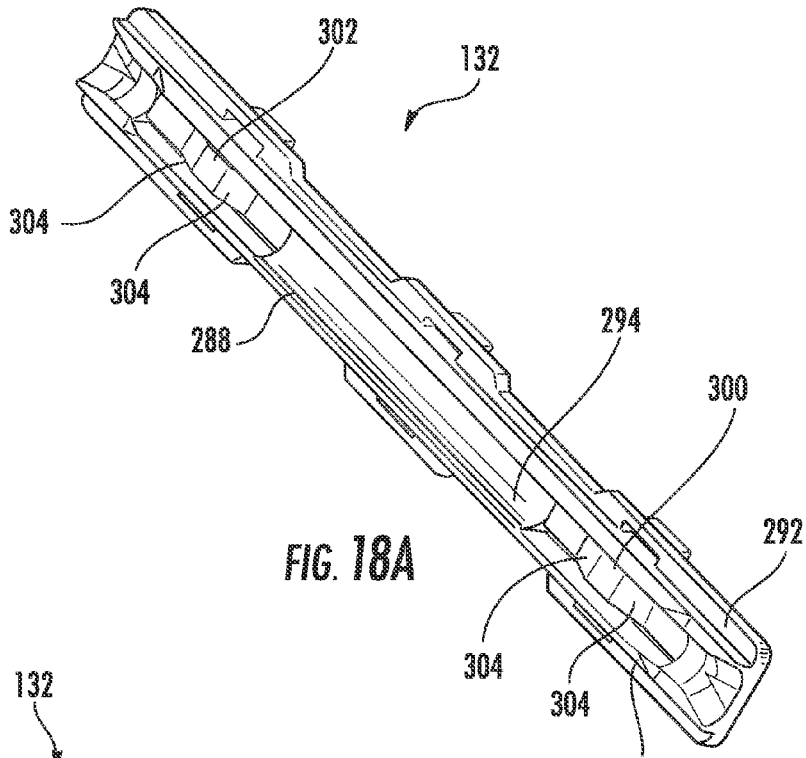
FIG. 18A is a front, perspective view of the rail guide mounted in the movable chassis.
Figure 18B:
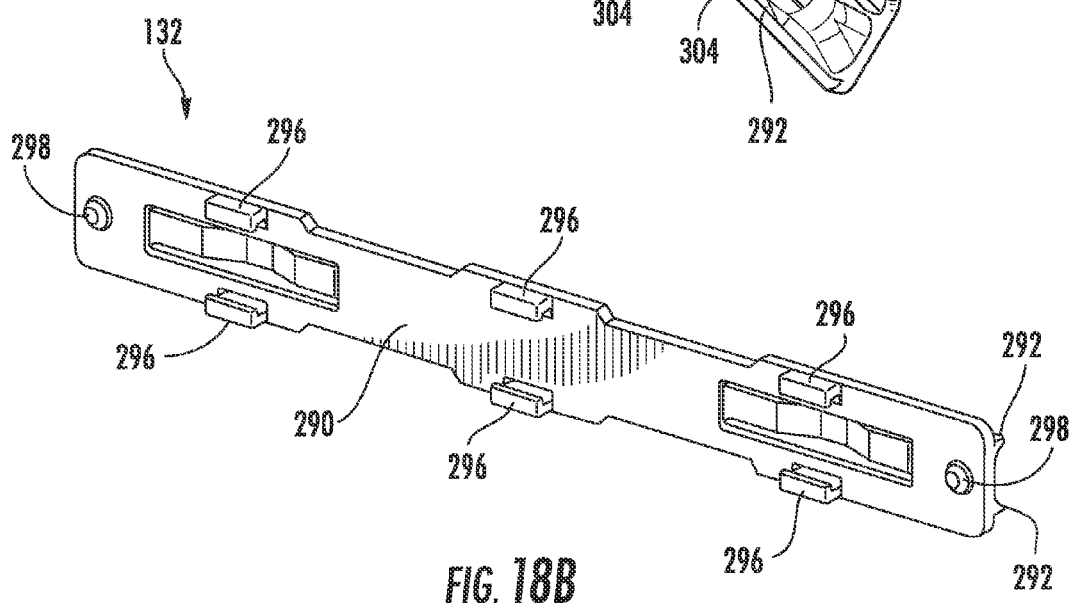
FIG. 18B is a rear, perspective view of the rail guide of FIG. 18A.

In this regard, FIGS. 18A and 18B are provided to allow for a more detailed discussion of the structure of the rail guide 132. The front 288 of the rail guide 132 is shown in FIG. 18A, and the back 290 of the rail guide 132 is shown in FIG. 18B. The rail guide 132 may be a generally elongated structure. Two guide walls 292 extend from front of the rail guide 132 to form a rail channel 294 therebetween. Mounting hooks 296 extend from the back 290 of the rail guide 132 and fit into mounting slots in the chassis top 78 and the chassis bottom 80 (not shown in FIG. 18B), allowing the rail guide 132 to be removably mounted to the chassis top 78 and/or the chassis bottom 80. Alignment pins 298 position in alignment holes in the chassis top and chassis bottom (not shown in FIG. 18B) to retain the guide rail 132 in proper alignment.

A first protrusion 300 and a second protrusion 302 are formed within the rail channel 294. The first protrusion 300 and the second protrusion 302 are resiliently flexible allowing them to repeatedly flex toward the back 290 of the rail guide 132 and return toward the front 288 of the rail guide 132. Additionally, the first protrusion 300 and second protrusion 302 each comprise side ramps 304. When the splice module holder 44 and/or the cassette 46, 48 are inserted in the rail guide 132, the holder rail 174 and/or the cassette rail 282, as the case may be, engages with the rail channel 294. When the holder rail 174 and/or the cassette rail 282 contact the first protrusion 300, the holder rail 174 or cassette rail 282 contacts the side ramp 304 and forces the first protrusion 300 to flex toward the back 290 of the rail guide 132. The holder rail 174 and/or cassette rail 282 may slide along the rail channel with the first protrusion 300 flexed towards the back 290 of the rail guide 132 until the second holder detent 178 and/or second cassette detent 286 engages the first protrusion 300. At that point, the first protrusion 300 is allowed to return toward the front 288 of the rail guide 132 by inserting into the second holder detent 178 and/or the second cassette detent 286, releasably locking the splice module holder 44 and/or cassette 46, 48 in the movable chassis 34. This provides a first stop position at which the splice module holder 44 or the cassette 46, 48 may be partially extended out of the movable chassis 34.

Applying pressure to the splice module holder 44 and/or the cassette 46, 48 causes the holder rail 174 and/or the cassette rail 282 to flex the first protrusion 300 disengaging the second holder detent 178 and/or the second cassette detent 286 from the first protrusion 300 allowing the splice module holder 44 and/or the cassette 46, 48 to slide along the rail channel 294. The splice module holder 44 and/or cassette 46, 48 may then slide along the rail channel 294 until the second holder detent 178 and/or the second cassette detent 286 engages the second protrusion 302. At or near to the same time, the first holder detent 176 and/or the first cassette detent 284 engages the first protrusion 300. The process discussed above occurs again, but this time with the first protrusion 300 flexing and then returning to insert into the first holder detent 176 and/or the first cassette detent 284. And the second protrusion 302 flexes and returns to insert in the second holder detent 178 and/or the second cassette detent 286. This provides a second stop position at which the splice module holder 44 and/or cassette 46, 48 may be releasably locked in the movable chassis 34.

Figure 19:
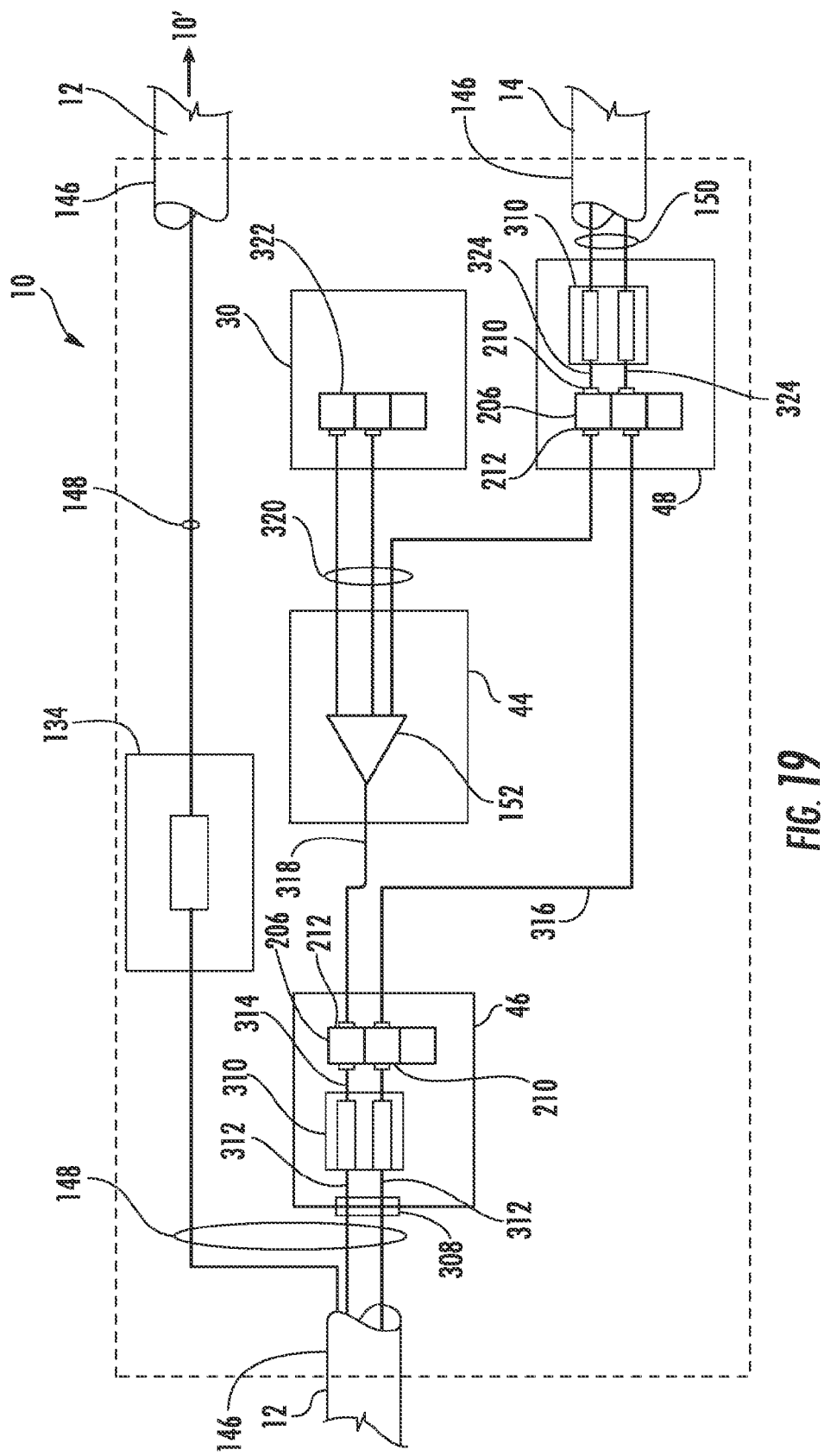
FIG. 19 is a block diagram illustrating an exemplary embodiment of optical fiber routing and connections between a enclosure splice tray, a feeder cassette, a distribution cassette, a splitter module, and connection holders in the fiber optic terminal.

Referring now to FIG. 19, a block diagram illustrates the components and the routing of optical fibers in the fiber optic terminal 10 according to an exemplary embodiment. The blocks and lines interconnecting the blocks as shown in FIG. 19 are diagrammatic only and are for ease of explanation and not necessarily meant to indicate any specific number of components and/or optical fibers. In FIG. 19, two sections of the feeder cable 12 are shown entering the fiber optic terminal 10. The feeder cable 12 may extend from and or be optically connected to a central office, central switching station, head end, or the like, of the service provider. As discussed above, the jackets 146 on the feeder cable 12 and the distribution cable 14 are removed when in the fiber optic terminal 10. An optical fiber 148 from one section of the feeder cable 12 routes to the enclosure splice tray 134, where it is spliced to another optical fiber 148 from the other section of the feeder cable 12. The other section of the feeder cable 12 may then route to another fiber optic terminal 10' or other fiber optic network device. In this manner, more than one fiber optic terminal 10, 10' may be optically connected to the same feeder cable 12 providing for the concatenation or series connection of the fiber optic terminals 10, 10'. As an example, the feeder cable 12 may comprise 72 optical fibers 148. If 12 optical fibers 148 are used in each of the fiber optic terminals 10, 10', then, 6 fiber optic terminals 10, 10' may be concatenated on the same feeder cable 12. However, every time an optical fiber 148 is spliced, some optical signal attenuation may occur, which should be taken into account.

One or more optical fibers 148 may route from the feeder cable 12 to the feeder cassette 46 and connect to a multi-fiber connector 310 mounted in the feeder cassette 46. The multi-fiber connector 310 may be an MTP connector as commercialized by Corning Cable Systems LLC, Hickory, N.C. The feeder cassette 46 may contain splice holder 308. Optical fibers 312 from the multi-fiber connector 310 may route to the cassette splice tray 310 where they are spliced to connectorized optical fibers 314 that route to the first end 210 of the fiber optic adapters 206 mounted in the feeder cassette 46. A connectorized jumper 316 may route directly from one of the second ends 212 of the fiber optic adapter 206 in the feeder cassette 46 to the distribution cassette 48 and connect to one of the second ends 212 of the fiber optic adapters 206 in the distribution cassette 48.

A connectorized pigtail 318 may route from another one of the second ends 212 of the fiber optic adapters 206 in the feeder cassette 46 to the splitter module 152 and input into the splitter module 152. The optical signal carried by the connectorized pigtail, or input splitter leg, 318 inputted into the splitter module 152 may be split into multiple optical signals each carried by a separate output splitter leg 320 output from the splitter module 152. The splitter legs 320 may be connectorized pigtails. One or more of the output splitter legs 320 may route to the connector holders 322 on the connector holder block 50 in the parking area 42 or to the distribution cassette 48. An output splitter leg 320 routed to the distribution cassette 48 may connect to the second end 212 of the fiber optic adapter 206 in the distribution cassette 48. A splice holder 308 may be mounted in the distribution cassette 48. Connectorized optical fibers 324 may route from the first end 210 of the fiber optic adapters 206 in the distribution cassette 48 to the cassette splice tray 310 and splice to optical fibers 150 in a distribution cable 14. The distribution cable 14 may then route from the fiber optic terminal 10 towards the subscriber premises in the fiber optic network. Additionally, an output splitter leg 320 initially routed to a connector holder 322 may be removed from the connector holder 322 and routed to the distribution cassette 48 and connect to the second end 212 of the fiber optic adapter 206. In these ways, optical connection is established between the optical fiber in the feeder cable and the optical fiber in the distribution cable, enabling optical connectivity, and thereby optical communication services, between the service providers central office, central switching station, head end, or the like, and the subscriber premises.

Figure 20:
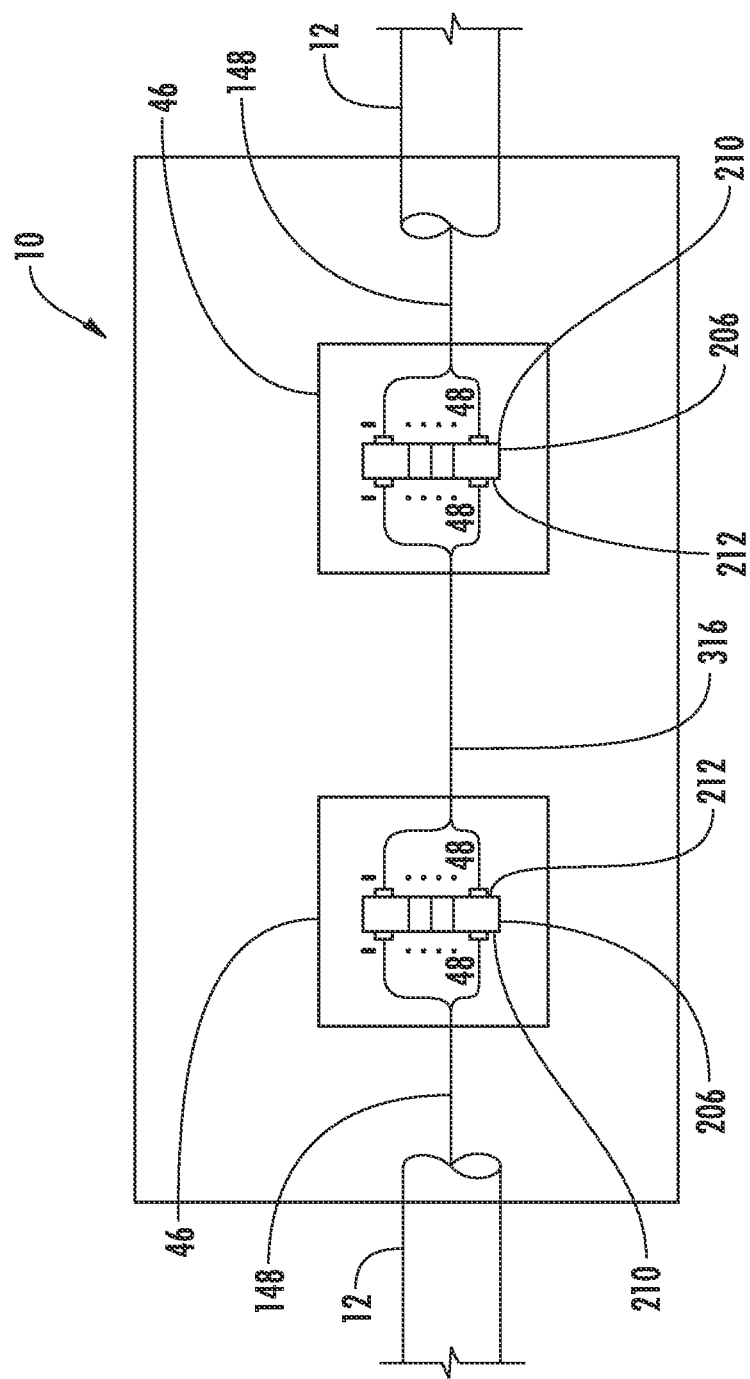
FIG. 20 is a block diagram illustrating an exemplary embodiment of optical fiber routing and connections in the fiber optic terminal configured as a cross-connect.

Referring now to FIG. 20, there is shown a block diagram of the fiber optic terminal 10 configured as a cross-connect. In the embodiment shown in FIG. 20, two feeder cables 12 enter the fiber optic terminal 10. Each of the feeder cables 12 has 48 optical fibers 148. Although the feeder cables 12 in this embodiment have 48 optical fibers 148, the feeder cables 12 may have any quantity of optical fibers. The feeder optical fibers 148 route to feeder cassettes 46 and connect to the first end 210 of fiber optic adapters 206. A multifiber jumper 316 may then connect to the second ends 212 of each of the feeder cassettes 46. Although in FIG. 20, the optical fibers of the jumper 316 are shown connected to the fiber optic adapters in the same 1 to 48 alignment at each feeder cassette 46 that is just for ease of explanation. Thus, the optical fibers in the jumper 316 may connect to the fiber optic adapters in any order or alignment as required for the particular application.

Figure 21:
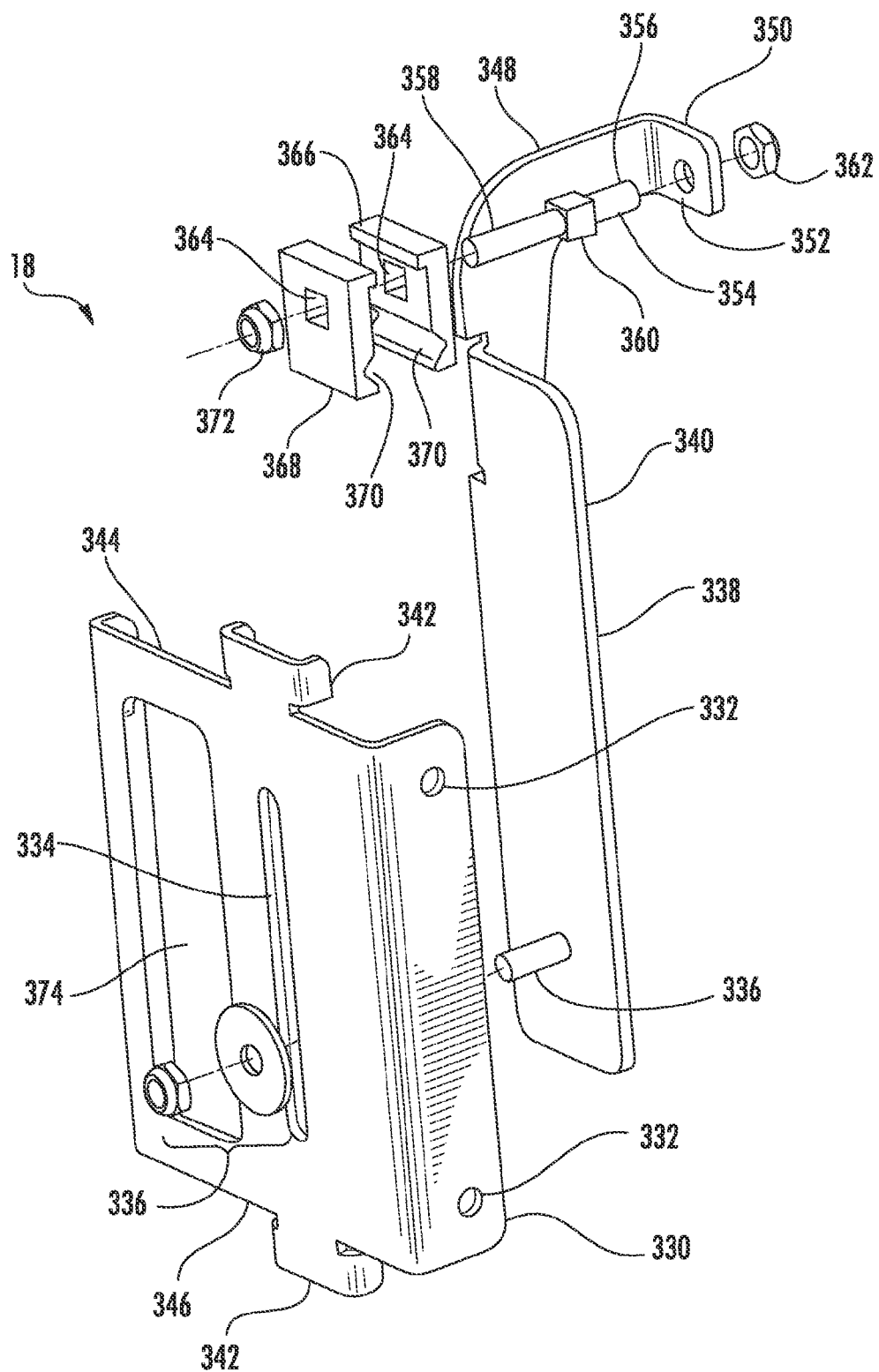
FIG. 21 is an exploded, perspective view of an exemplary embodiment of a strand attachment assembly for suspending the fiber optic terminal from a strand in the aerial environment.

Referring now to FIG. 21, there is shown a detail of the hanger bracket assembly 18. The hanger bracket assembly 18 is used for an aerial installation of the fiber optic terminal 10 by suspending the fiber optic terminal 10 from a strand strung between two supports, such as, for example, two utility poles. Additionally, the hanger bracket assembly 18 may be used to suspend the fiber optic terminal 10 from a hanger bar in a pedestal as further discussed herein. The hanger bracket assembly 18 adjustably attaches to the fiber optic terminal 10 using an enclosure mount 330. The enclosure mount 330 has two attachment holes 332 that may be used for attaching the enclosure mount to the fiber optic terminal 10. A vertical slot 334 in the enclosure mount is adapted to receive hanger bracket pin 336 extending from hanger bracket 338. The vertical slot 334 allows the hanger bracket assembly 18 to be vertically adjustable to accommodate any particular space issues. A nut and washer combination 336 may be used to tighten the hanger bracket pin 336 to the enclosure mount 330. When tightened to the enclosure mount 330, hanger bracket plate 340 fits into channel pieces 342 that extend from top 344 and bottom 346 of the enclosure mount 330. By the hanger bracket plate 340 fitting into the channel pieces 342, the hanger bracket 338 may be held securely stable.

The hanger bracket 338 has a hanger bracket plate 340 extends vertically to and terminates in a curved hanging piece 348. A tab 350 having a clamp attachment hole 352 extends perpendicularly in the vertical plane from the hanging piece 348. A clamp pin 354 comprises a bracket end 356, clamp end 358 and a cubed portion 360 positioned between the bracket end 356 and the clamp end 358. The clamp pin 354 inserts through the clamp attachment hole 352 at a bracket end 356 where it is secured by a nut 362. The clamp pin 354 at the clamp end 358 inserts through square openings 364 in first clamp piece 366 and second clamp piece 368. The first clamp piece 366 and the second clamp piece 368 have similar opposing notches 370. The strand 16 or a hanger bar (neither of which are shown in FIG. 21) may be directed between the first clamp piece 366 and the second clamp piece 368 such that the strand or hanger bar aligns with the notches 370. The cubed portion 360 is slightly smaller than the square openings 364 to allow it to fit within both square openings 366 but to prevent rotation of the first clamp piece 366 and the second clamp piece 368. A nut 372 attaches to the clamp end 358 and is tightened against the second clamp piece 368. When the nut 372 is tightened it forces the second clamp piece 368 against the first clamp piece 366, thereby, squeezing the strand 16 or hanger bar between the second clamp piece 368 against the first clamp piece 366 and preventing the fiber optic terminal 10 from moving.

A portion of the enclosure mount 330 may be cut-out to form a handle 374. When the enclosure mount 330 is attached to the fiber optic terminal 10, the handle 374, may be used to lift the fiber optic terminal to facilitate attaching the strand bracket assembly 18 to the strand 16. If an enclosure mount 330 is attached to both ends of the fiber optic terminal 10, both handles 374 may be used to lift and steady the fiber optic terminal when attaching the strand bracket assembly to the strand 16.

Referring now to FIG. 22, a portion of the interior space 25 with strain relief members 380 and grounding assembly 138 is illustrated. A feeder cable 12 or distribution cable 14 may enter the enclosure 20 through the entry port 140. The jacket 146 is removed allowing the optical fiber 148, 150 to route separately within the enclosure 20. An adjustable clamp 381 may attach the feeder cable 12 or the distribution cable 14 to one of the strain relief members 380 to provide strain relief for the feeder cable 12 or the distribution cable 14. A ground wire 151 may be routed from the feeder cable 12 or the distribution cable 14 to the grounding assembly 140.

In the embodiment in FIG. 22, a tonable grounding assembly 138 is illustrated. The grounding assembly 138 provides for the grounding and bonding of armored cables and those with metallic elements. The wire connector 139 attached to the ground wire 151 connects to a ground stud 141 at an insulating plate 143. A grounding nut 145 tightens the ground stud 141 to a grounding plate 147. When the grounding nut 145 is tightened, the ground wire 151 is grounded to the grounding plate 147 through the ground stud 141 and, thereby, to the system ground for the fiber optic network. However, when the grounding nut 145 is loosened, the grounding stud 141 is isolated from ground due to the insulation plate 143. Therefore, the wire connector 139 and the ground wire 151 are also isolated from ground. Because the ground wire 151 is isolated from ground, the feeder cable 12 or the distribution cable 14 may be identified at different points in the fiber optic network by testing using a radio frequency (RF) signal. The RF signal is transmitted from one end of the feeder cable 12 or distribution cable 14, and detected at another end of the feeder cable 12 or distribution cable 14 at another piece of equipment or terminal.

Referring now to FIGS. 22A and 22B, the fiber optic terminal 10 is illustrated mounted to a pedestal 386. In this embodiment, the fiber optic terminal 10 may be mounted in a vertical orientation as opposed to a strand mounted as illustrated in FIG. 1, which may be generally in a horizontal orientation. In other words the longitudinal axis "L" of the fiber optic terminal 10 may be oriented in a generally vertical direction. Additionally the greatest transverse dimension "w" of the fiber optic terminal 10 may be less than the internal diameter "d" of a pedestal cover 388. In this way, the pedestal cover can fit over the fiber optic terminal 10 allowing the fiber optic terminal to be used in standard pedestal installations without the need to redesign the pedestal 386 as shown in FIG. 22A. FIG. 22B illustrates a mounting detail of the fiber optic terminal 10 using a pedestal bracket 390 which secures to the pedestal 386 and the enclosure 20 of the fiber optic terminal 10.

Figure 24A:
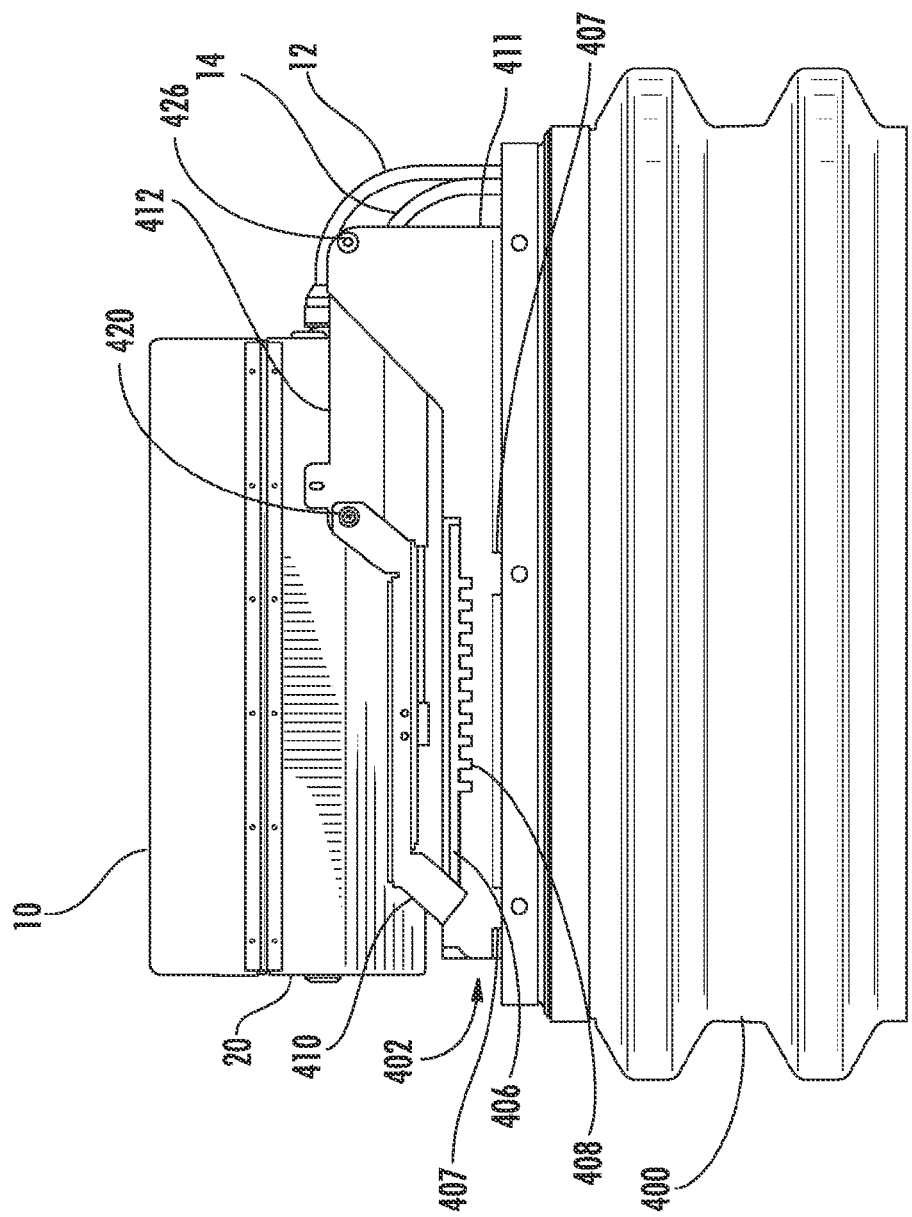
FIG. 24A is a front, elevation view of the fiber optic terminal of FIG. 1 mounted on a "dog-house" style support using an inclinable frame.
Figure 24B:
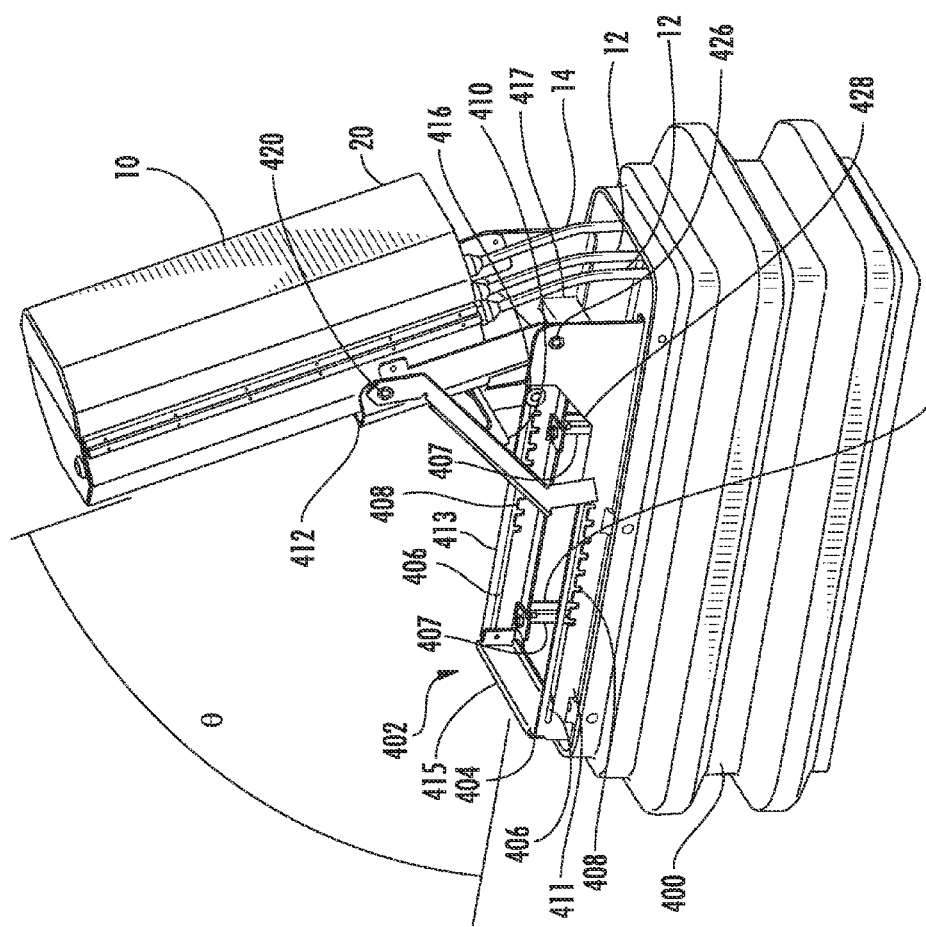
FIG. 24B is a top, perspective view of the fiber optic terminal mounted on the "dog-house" style support in FIG. 24A with the inclinable frame adjusted to incline the fiber optic terminal at an angle to facilitate access to the fiber optic terminal.

Referring now to FIGS. 24A and 24B, the fiber optic terminal 10 is illustrated mounted to a "dog-house" or low-profile pedestal 400. Typically, multiple system operators (MSO) use the dog-house support 400 to house nodes to convert from optical to electrical signals (coax) and amplifiers to boost coax signals as part of the distribution network. Thus, the dog-house support 400 has been developed to a regular, acceptable design and size for CATV applications. In the embodiment shown in FIG. 24A and FIG. 24B, the fiber optic terminal 10 may be mounted to the regular, acceptable dog-house support 400 without any modification or re-design. The fiber optic terminal may mount to the dog-house support 400 using a support assembly 402. The support assembly 402 may be adapted to provide an inclining motion to the fiber optic terminal 10. In other words, the support assembly 402 may allow the fiber optic terminal 10 to be tilted upwardly through, and be positioned at different degrees "Φ" of incline, measured from the plane of the top 403 of the dog-house support 400, which would generally approximate the horizon. Inclining the fiber optic terminal 10 in such a manner may result in the fiber optic terminal 10 being more easily accessible to a field technician, and, thereby facilitate the installation, configuration, or re-configuration of the fiber optic terminal 10 by the field technician. Additionally or alternatively, one or more points of the support assembly 402 may be adjustably mounted to the dog-house support 400. In this manner, the fiber optic terminal may be raised from the top 403 of the dog-house support 400 to also provide better access to a field technician, or to perform effective leveling of the fiber optic terminal 10.

In this regard, FIG. 24A illustrates the fiber optic terminal in a stowed position, generally parallel with the plane of the top 403 of the dog-house support 400 and, generally, horizontal. FIG. 24B illustrates the fiber optic terminal in an inclined position. The frame assembly 402 attaches to the dog-house support by frame base 404. The frame base 404 may be a generally rectangular open frame structure having a first side 411, a second side 413, a first end 415 and a second end 417 and defining a frame area 405 therewithin. The frame base 404 may be sized to fit on the top 403 of the dog-house support 400. Frame base 404 attaches to the dog-house support 400 using one or more adjustable frame support brackets 407. In the embodiment shown in FIG. 24A and FIG. 24B, four frame support brackets 407 are shown, two on first side 411 and two on second side 413. Any number of frame support brackets 407 may be used. The frame base 404 may have frame slots 406 on a first side 411 and a second side 413. Multiple incline notches 408 are formed along the first side 411 and the second side 413 in at least a portion of the frame slots 406. The incline notches 408 on the first side 411 are aligned with the incline notches 408 on the second side 413. Incline brackets 410 may be in a general "z" shape and may attach to the frame base 404 at the first side 411 and the second side 413. Additionally, the incline brackets 410 may also attach to terminal rack 412.

Referring also now to FIG. 24B, the frame assembly 402 is shown in an inclined orientation with respect to the dog-house support 400. Frame end 414 of the incline brackets 410 has a frame pin 416. One frame pin 406 on each incline bracket 410 extends towards the frame area 405 formed by the frame base 404. The frame pins 416 insert into the frame slots 408 allowing the frame pins 416 to move along the frame slots 408. A bracket end 418 on each of the incline brackets 410 rotatably attach to the terminal rack 412 on two opposing sides of the terminal rack 412. The bracket ends 418 rotatably attach to the terminal rack 412 by rack pins 420 that extend from the terminal rack 412. The terminal rack 412 rotatably attaches to a first pivot end 422 the first side 411 and a second pivot end 424 on the second side 413 by pivot pins 426.

As the frame pins 416 move along the slot 406, the incline brackets 410 force the terminal rack 412, and, thereby, the fiber optic terminal 10 to incline. The terminal rack 412 inclines as the first pivot end 422 and the second pivot 424 rotate around pivot pins 426. The frame pins 416 moving along the slot 405 also cause the bracket ends 418 to rotate around the rack pins 420. The frame pins 416 continue to move along the slot 406 until they reach one of the notches 408. The frame pins 416 may position in one of the notches 408 on the first side 411 and an aligned one of the notches 408 on the second side 413. The notches 408 may be located on the first side 411 and the second side 413 to coordinate with certain degrees of incline of the fiber optic terminal 10 depending on where the frame pins 416 are located in the slots 406, and/or into which notches 408 the frame pins 416 position. In the embodiment shown in FIGS. 15 A and 15B, the terminal rack 412, and, thereby, the fiber optic terminal 10, may incline in increments "Φ" of 0, 10, 50, and 70 degrees. It should be understood, though, that the support assembly 402 may be designed to incline the fiber optic terminal 10 in any degree increments.

Continuing with reference to FIG. 24A and FIG. 24B, the frame support brackets 407 have attachment slots 428 for attaching to the dog-house support 400. The attachments slots 428 are adapted to receive a fastener, for example, without limitation, a bolt, washer and nut combination. When the fastener is tightened, the height of the support assembly 402, at that point, above the dog-house support 400 is fixed. Thus, by selectively locating the fastener in the attachment slot 428, an installer/technician can adjust the height of the support assembly 402 above the dog-house support 400. This adjustment capability may facilitate installation of the support assembly 402, for example, to address leveling requirements. Additionally, this adjustment capability may provide for better accessibility to the fiber optic terminal 10 by the installer/technician for configuration and re-configuration of the fiber optic terminal 10.

Referring now to FIGS. 25-28, embodiments illustrating other types of installation of the fiber optic terminal 10 are presented.

In FIG. 25, the fiber optic terminal is shown mounted in a dog-house support 400 similar to the one shown in FIGS. 24A and 24B. In the embodiment shown in FIG. 25, though, the enclosure 20 of the fiber optic terminal 10 is suspended from a hangerbar 460 attached to the dog-house support 400. Hanger bracket assemblies 18 may be used to suspend the enclosure 20 from the hanger bar 460 in the same way that the enclosure 20 may be suspended from a strand 16 as shown in FIG. 1.

Figure 26:
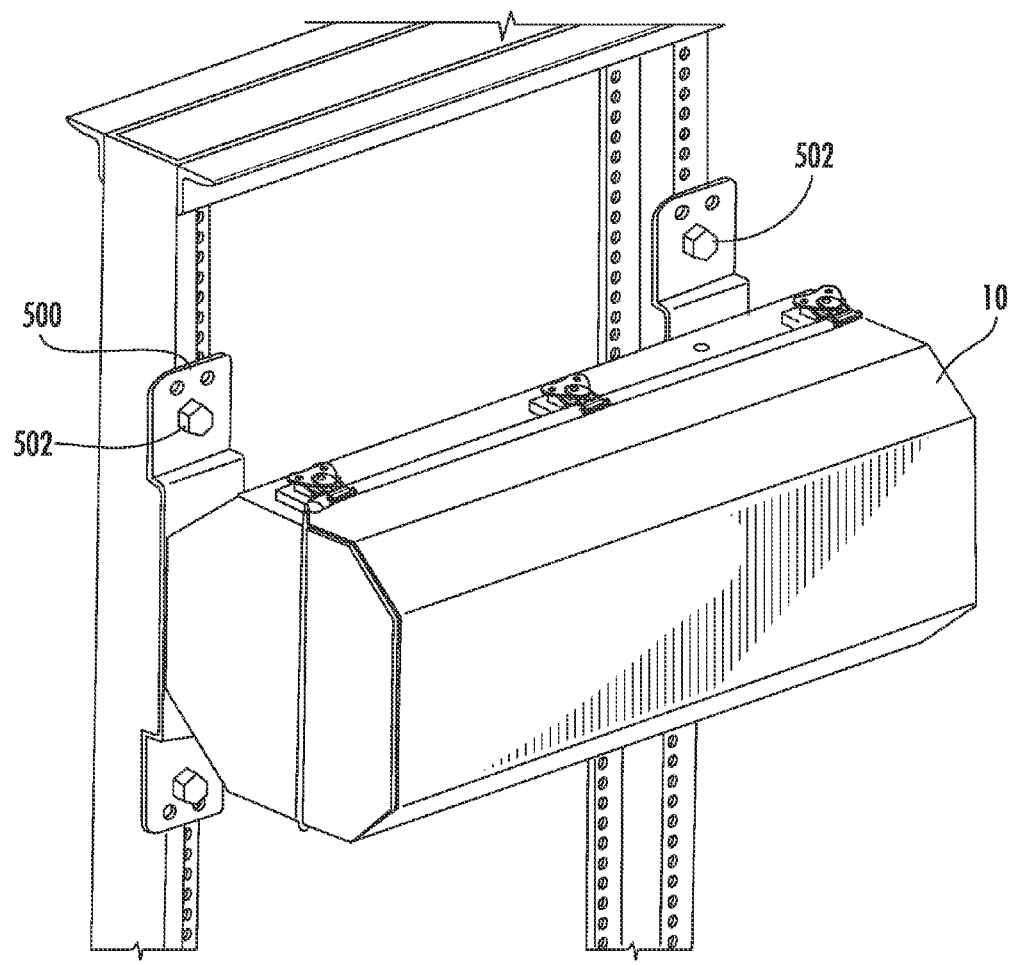
FIG. 26 is a top, perspective view of the fiber optic terminal of FIG. 1 mounted on a rack.

In FIG. 26, the fiber optic terminal 10 is shown mounted to a rack 500. The rack 500 may be located in a central office, central switching center or the like. Rack mounting brackets 502 may be used to attach the enclosure 20 of the fiber optic terminal 10 to the rack 500 using appropriate fasteners, which may include, without limitation, a bolt and nut combination, or the like. Typically, the fiber optic terminal 10 may be locate towards the top of the rack 500 so that the feeder cable 12 and the distribution cable 14 (not shown in FIG. 26) may then be routed from the fiber optic terminal 10 to a cable tray located above the rack 500 (not shown in FIG. 26).

Figure 27:
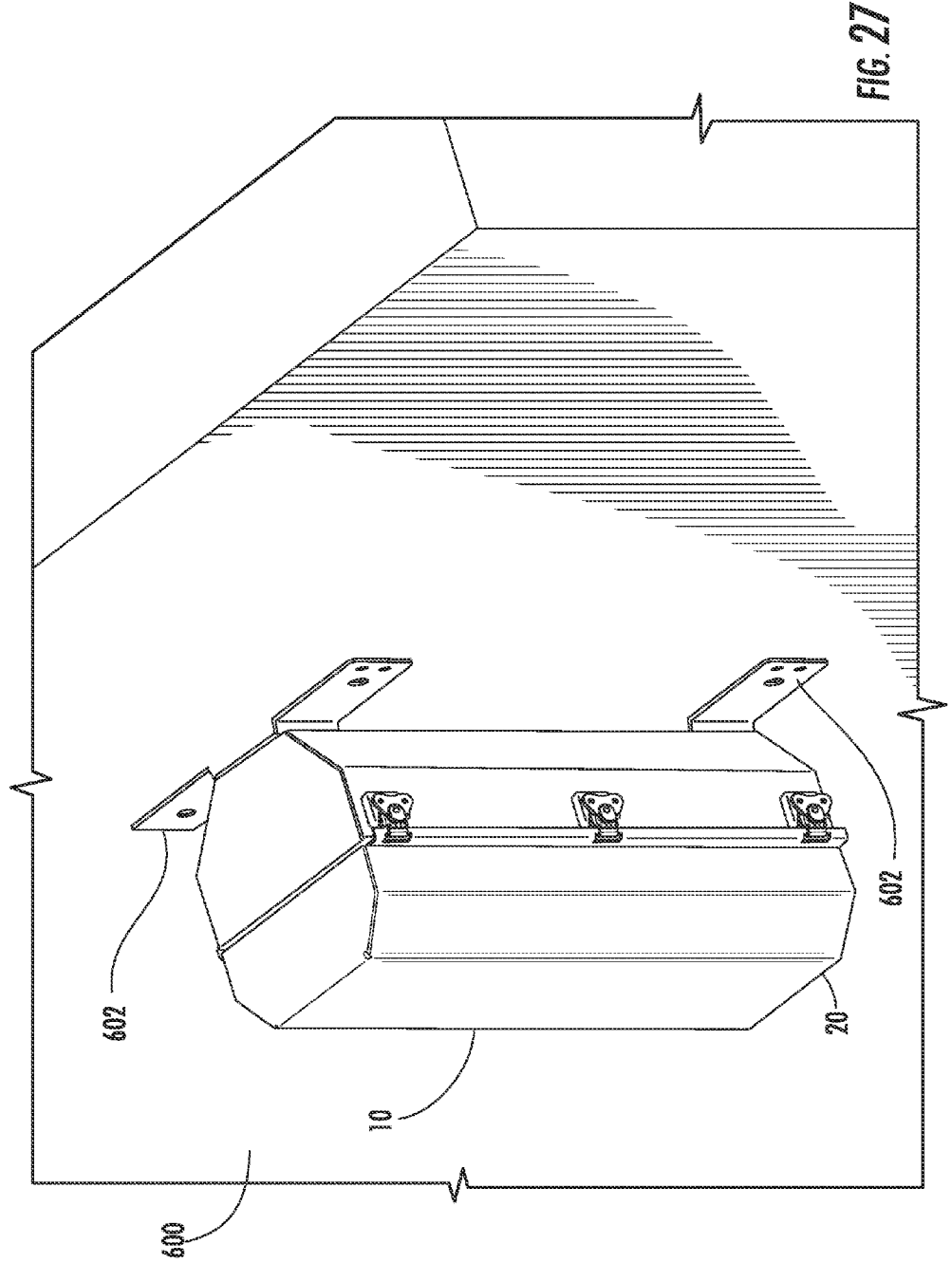
FIG. 27 is a top, perspective view of the fiber optic terminal of FIG. 1 mounted on a wall.

Referring now to FIG. 27, the fiber optic terminal 10 is shown mounted in a vertical orientation to a wall 600. The wall 600 may be in a room in a multiple dwelling unit (MDU) such that the fiber optic terminal 10 provides a local convergence point for that MDU. Wall brackets 602 may be used to mount the enclosure 20 of the fiber optic terminal 10 to the wall using the appropriate fasteners. Depending on the material from which the wall is constructed, such fasteners, may include, without limitation, anchor bolts, molly bolts, concrete anchors, or the like.

Figure 28:
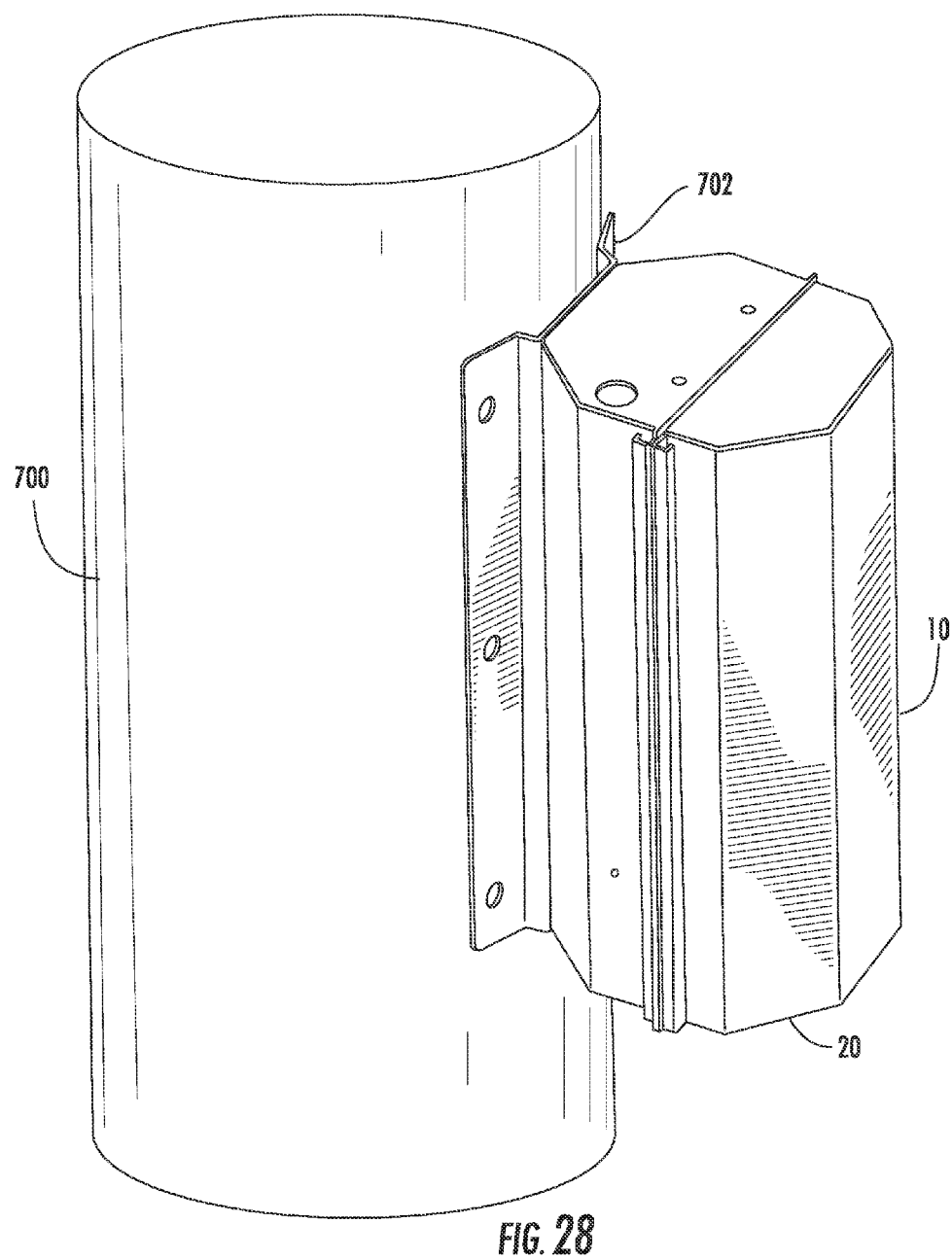
FIG. 28 is a top, perspective view of the fiber optic terminal of FIG. 1 mounted on a pole.

Referring now to FIG. 28, the fiber optic terminal 10 is shown mounted to a generally vertical support 700, such as a utility pole. The support 700 may be a point in an aerial installation which does not have access to a strand for strand mounting as shown in FIG. 1. A pole bracket 702 may be used to mount the enclosure 20 of the fiber optic terminal 10 to the support 700 using appropriate fasteners. Depending on the material from which the pole is constructed, such fasteners may include, without limitation, nails, wood screws, a metal strap wrapped around the pole, or the like.

It is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic terminal, comprising:
   an enclosure having a base and a cover defining an interior space, a feeder cable port for receiving into the interior space a feeder cable having at least one optical fiber, and a distribution cable port for receiving into the interior space a distribution cable having at least one optical fiber, wherein the base and the cover are hingedly connected so that the enclosure may be opened or closed by rotating one or more of the base and the cover to allow access to the interior space;
   a movable chassis hingedly connected to the base and the cover, wherein the movable chassis automatically extends out from the base when the enclosure is opened by rotating one or more of the base and the cover;
   at least one splitter module holder positioned in the interior space; and
   at least one cassette movably positioned in the interior space,
   wherein the at least one optical fiber of the feeder cable and the at least one optical fiber of the distribution cable are optically connected through the at least one cassette, and
   wherein the interior space is variably configurable by changeably positioning at least one of the at least one splitter module holder and the at least one cassette in the interior space wherein the movable chassis comprises a splitter holder area, and a cassette area, wherein the at least one splitter module holder movably positions in the splitter holder area and wherein the at least one cassette movably positions in the cassette area.

2. The fiber optic terminal of claim 1, further comprising:
   at least one splitter module movably positioned in the splitter module holder, wherein the at least one splitter module has an input optical fiber and a plurality of output optical fibers, and wherein the at least one optical fiber of the feeder cable optically connects to the input optical fiber, and wherein the at least one optical fiber of the distribution cable optically connects to one of the plurality of output fibers, and wherein the interior space is variably configurable by changeably positioning at least one of the at least one splitter module.

3. The fiber optic terminal of claim 1, wherein the movable chassis comprises a parking area, and further comprising a plurality of connector holders positioned in the parking area, wherein at least one of the plurality of output fibers routes to one of the plurality of connector holders in the parking area.

4. The fiber optic terminal of claim 1, wherein the movable chassis is movable between a first stop position, a second stop position, and a third stop position.

5. The fiber optic terminal of claim 4, wherein the first stop position comprises the movable chassis positioned in the base adjacent to a back of the base when the enclosure is closed.

6. The fiber optic terminal of claim 4, wherein the second stop position comprises the movable chassis partially extended from the base and tilted away from the cover.

7. The fiber optic terminal of claim 6, further comprising a double hinge assembly between the movable chassis and the cover, wherein the double hinge assembly allows the movable chassis to locate in multiple stop positions with respect to the base and the cover.

8. The fiber optic terminal of claim 4, wherein the third stop position comprises the movable chassis positioned in the cover when the enclosure is open.

9. The fiber optic terminal of claim 1, further comprising a protective shield movably attached to the movable chassis, and movable between a covered position and a raised position, and wherein the protective shield in the covered position covers at least a portion of the movable chassis including a portion of the at least one of the splitter module holder, the at least one cassette, and a parking area.

10. The fiber optic network apparatus of claim 9, wherein the protective shield is movable from the covered position to the raised position when the enclosure is open, and wherein the protective shield moves independently of movement of the movable chassis.

11. The fiber optic terminal of claims 1, further comprising a fiber management area in the interior space adjacent to the base, wherein at least one of the optical fibers of the feeder cable and the optical fibers of the distribution cable are routed and stored.

12. The fiber optic terminal of claim 11, wherein the fiber management area is accessible when the movable chassis is in a third stop position between a first stop position and a second stop position.

13. The fiber optic terminal of claim 1, wherein the at least one cassette is a feeder cassette, and wherein the optical fiber of the feeder cable optically connects to the feeder cassette.

14. The fiber optic terminal of claim 1, wherein the at least one cassette is a distribution cassette, and wherein the optical fiber of the distribution cable optically connects to the distribution cassettes.

15. The fiber optic terminal of claim 1, wherein the at least one cassette comprises at least one of a feeder cassette and a distribution cassette, and wherein the distribution cassette and the feeder cassette are interchangeable.

16. The fiber optic terminal of claim 1, wherein the at least one cassette comprises a front section and a rear section separated by a front wall, and wherein fiber optic adapters mount in the front wall and extend between the rear section and the front section, and wherein the front section has a pivotable frame assembly that pivots between a first stop position and a second stop position, and wherein the second stop position expands access to the fiber optic adapters.

17. The fiber optic terminal of claim 1, wherein at least one optical component releasably mounts in the at least one cassette.

18. The fiber optic terminal of claims 17, wherein the at least one optical component comprises at least one of a splitter tray, a wave division multiplexer, a multi-fiber connector adapter, and a buffer tube slack storage.

19. The fiber optic terminal of claim 1, wherein the enclosure mounts to a strand using a strand attachment assembly, wherein the strand is strung between two supports in an elevated orientation.

20. The fiber optic terminal of claim 19, wherein the strand attachment comprises a handle, and wherein the fiber optic terminal may be lifted by the handle.

21. The fiber optic terminal of claim 1, wherein the enclosure mounts to a dog-house support at a top of the dog-house support using a support assembly, wherein the support assembly is configured to incline the fiber optic terminal a certain degree as measured from a plane of the top of the dog-house support.

22. The fiber optic terminal of claim 21, wherein the certain degree is in the range from about 0-70 degrees.

23. The fiber optic terminal of claim 1, wherein the enclosure mounts to a pedestal, and a pedestal cover is adapted to cover the enclosure.

24. The fiber optic terminal of claim 1, wherein the movable chassis comprises a plurality of rail guides arranged in pairs of opposing rail guides.

25. The fiber optic terminal of claim 24, wherein the at least one cassette comprises rails that engage the rail guides when the at least one cassette movably positions in the movable chassis.

26. The fiber optic terminal of claim 24, wherein the at least one splitter module comprises rails that engage the rail guides when the at least one splitter module movably positions in the movable chassis.

27. A fiber optic terminal, comprising:
an enclosure having a base and a cover defining an interior space; and
a movable chassis positioned in the interior space, wherein the movable chassis automatically extends out from the base when the cover is opened, and wherein the movable chassis is movable between a first stop position, a second stop position, and a third stop position, and wherein the interior space is variably configurable by changeably positioning at least one feeder cassette and at least one distribution cassette in the movable chassis wherein the second stop position comprises the movable chassis partially extended from the base and tilted away from the cover, and wherein the movable chassis automatically moves from the first stop position to the second stop position when the enclosure is opened.

28. The fiber optic terminal of claim 27, wherein the first stop position comprises the movable chassis positioned in the base adjacent to a back of the base when the enclosure is closed.

29. The fiber optic terminal of claim 27, further comprising a double hinge assembly between the movable chassis and the cover.

30. The fiber optic terminal of claim 27, wherein the third stop position comprises the movable chassis positioned in the cover when the enclosure is open.

31. A method for distributing optical signals from a service provider to a subscriber, comprising the steps of:
providing an enclosure having a base and a cover defining an interior space, a feeder cable port for receiving into the interior space a feeder cable having at least one optical fiber, and a distribution cable port for receiving into the interior space a distribution cable having at least one optical fiber, wherein the base and the cover are hingedly connected so that the enclosure may be opened or closed by rotating one or more of the base and the cover to allow access to the interior space;

positioning a movable chassis in the interior space, wherein the movable chassis comprises a cassette area, and wherein the movable chassis automatically extends out from the base between a first stop position, a second stop position, and a third stop position when the enclosure is opened by rotating one or more of the base and the cover;

movably positioning at least one cassette in the cassette area, and, wherein the at least one optical fiber of the feeder cable and the at least one optical fiber of the distribution cable are optically connected through the at least one cassette, and wherein the interior space is variably configurable by changeably positioning the at least one feeder cassette and the at least one distribution cassette in the movable chassis.

32. The method of claim 31, wherein the movable chassis comprises a splitter holder area, and further comprising:

movably positioning at least one splitter module holder in the splitter holder area; and movably positioning at least one splitter module in the splitter module holder, wherein the at least one splitter module has an input optical fiber and a plurality of output optical fibers, and wherein the at least one optical fiber of the feeder cable optically connects to the input optical fiber, and wherein the at least one optical fiber of the distribution cable optically connects to one of the plurality of output fibers, and wherein the interior space is variably configurable by changeably positioning at least one of the at least one splitter module.

* * * * *